(12) United States Patent
Rausch et al.

(10) Patent No.: US 9,247,514 B2
(45) Date of Patent: Jan. 26, 2016

(54) MACRO-NETWORK LOCATION DETERMINATION, LOCAL-OSCILLATOR STABILIZATION, AND FRAME-START SYNCHRONIZATION BASED ON NEARBY FM RADIO SIGNALS

(71) Applicant: Clearwire IP Holdings LLC, Kirkland, WA (US)

(72) Inventors: Walter Rausch, Shawnee, KS (US); Durga Prasad Satapathy, Ashburn, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 250 days.

(21) Appl. No.: 13/935,225

(22) Filed: Jul. 3, 2013

(65) Prior Publication Data

US 2013/0294342 A1 Nov. 7, 2013

Related U.S. Application Data

(63) Continuation of application No. 13/023,269, filed on Feb. 8, 2011, now Pat. No. 8,503,368.

(51) Int. Cl.
| | |
|---|---|
| *H04W 56/00* | (2009.01) |
| *G01S 5/02* | (2010.01) |
| *G01S 5/08* | (2006.01) |
| *H04W 88/08* | (2009.01) |

(52) U.S. Cl.
CPC ............ *H04W 56/002* (2013.01); *G01S 5/021* (2013.01); *G01S 5/0242* (2013.01); *G01S 5/08* (2013.01); *H04W 56/0045* (2013.01); *H04W 88/08* (2013.01)

(58) Field of Classification Search
CPC ...................................................... H04W 56/00
See application file for complete search history.

(56) References Cited

U.S. PATENT DOCUMENTS

| | | | | |
|---|---|---|---|---|
| 2009/0276542 | A1* | 11/2009 | Aweya | H04J 3/0667 709/248 |
| 2011/0188480 | A1* | 8/2011 | Takagi | H04W 56/0015 370/335 |

* cited by examiner

*Primary Examiner* — Andrew Lai
*Assistant Examiner* — Sumitra Ganguly

(57) ABSTRACT

Exemplary methods and systems may generally be implemented to allow a macro-network base station without access to a GPS reference signal to provide some or all of the functionality for which existing macro-network base stations typically rely on GPS. In a first aspect, an exemplary macro-network base station may determine its location using a location-determination technique that is based upon the angles of arrival of FM radio signals from nearby FM stations. In a second aspect, an exemplary macro-network base station may stabilize its local oscillator by phase-locking its local oscillator to an FM radio signal, and periodically adjusting its local oscillator to account for phase drift of the FM radio signal. And in a third aspect, an exemplary macro-network base station may synchronize its frame-start timing with a nearby base station using a frame-start timing signal that the base station has synchronized to frame transmissions from the nearby base station during a setup routine.

11 Claims, 13 Drawing Sheets

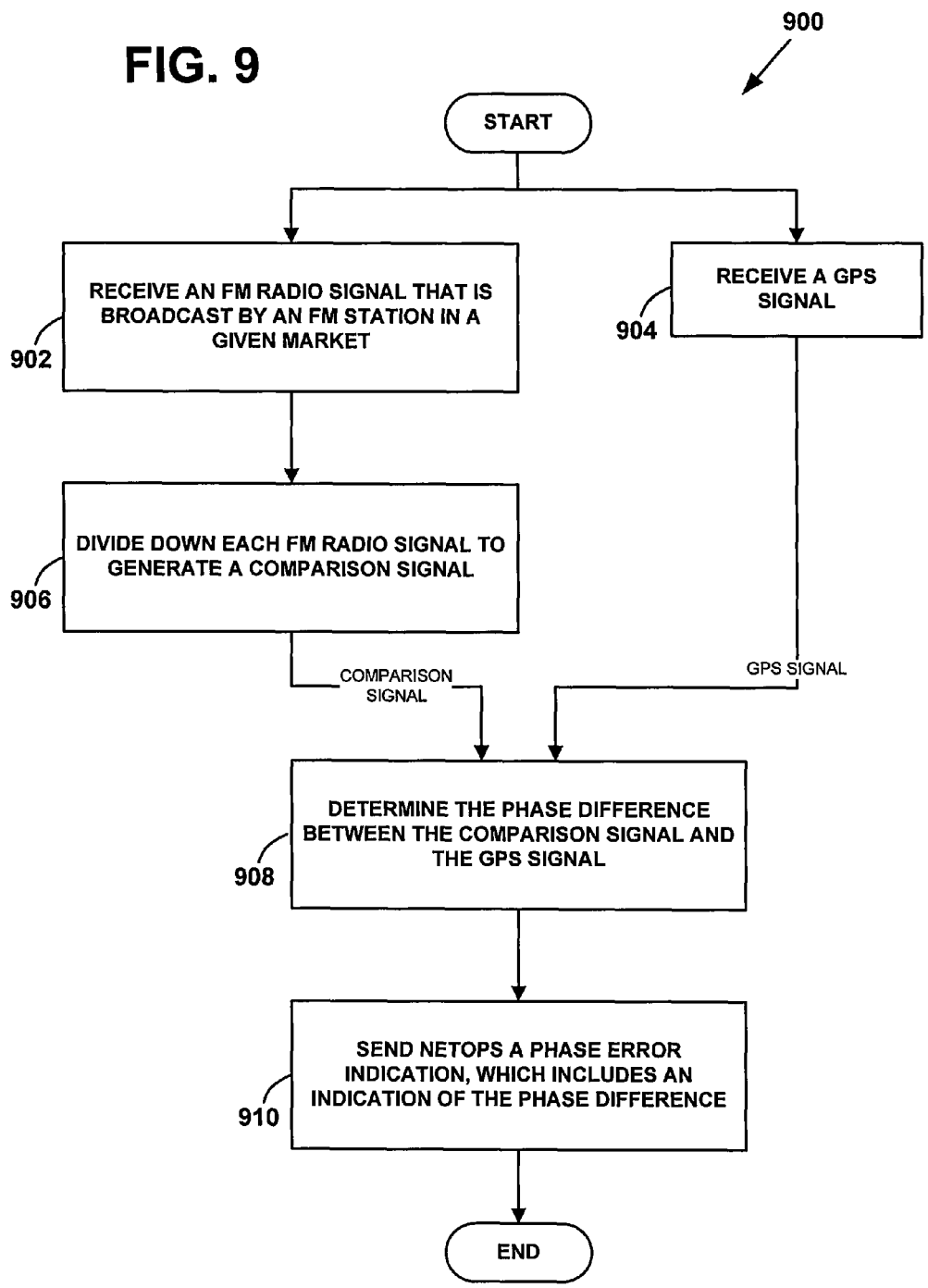

MACRO-NETWORK LOCATION DETERMINATION, LOCAL-OSCILLATOR STABILIZATION, AND FRAME-START SYNCHRONIZATION BASED ON NEARBY FM RADIO SIGNALS

RELATED APPLICATION

This application claims priority to U.S. patent application Ser. No. 13/023,269, filed Feb. 8, 2011 and entitled "Macro-Network Location Determination, Local-Oscillator Stabilization, and Frame Start Synchronization Based on Nearby FM Radio Signals," now pending, the contents of which are incorporated by reference herein for all purposes.

BACKGROUND

The recent introduction of WiMAX technology and other fourth-generation (4G) air-interface protocols promises to further increase the proliferation of wirelessly-equipped devices. WiMAX (Worldwide Interoperability for Microwave Access) is an Institute of Electrical and Electronics Engineers (IEEE) standard, designated 802.16, with the 802.16e being the current version of the standard (the terms "IEEE 802.16," "IEEE 802.16e," and "WiMAX" may be used interchangeably herein). WiMAX provides a robust mechanism for wireless communication between base stations and subscriber stations. In particular, WiMAX is designed to provide fixed, portable or non-line-of-sight service with a potential range of five miles, a throughput on the order of thirty megabits per second, and superior quality of service and security.

WiMAX chipsets that provide for communication in accordance with the WiMAX protocol are becoming increasingly prevalent as standard or optional equipment not only in traditional wireless communications devices, such as cellular phones and personal digital assistants, but also in devices that, heretofore, were not used for access to telephony networks. These devices include portable music players, entertainment devices such as game players, automobiles, domestic appliances and so on.

WiMAX networks are typically implemented as a macro cellular wireless networks (which may also be referred to as "macro networks"), which typically provide communication services such as voice, text messaging, and packet-data communication for WiMAX-capable mobile stations. Such mobile stations (which may also be referred to as access terminals, subscriber stations, or client devices, among other terms) and networks typically communicate with each other over a radio frequency (RF) air interface according to one or more wireless protocols (e.g. WiMAX, CDMA (Code Division Multiple Access), EV-DO (Evolution Data Optimized), and/or one or more others). Mobile stations typically conduct wireless communications with these networks via one or more base transceiver stations (base stations), each of which send communications to and receive communications from mobile stations over the air interface.

Each base station is in turn connected with a network entity known as a base station controller (BSC) (which may also be referred to as a radio network controller (RNC)), which controls one or more base stations and acts as a conduit between the one or more base stations and one or more switches or gateways, such as a mobile switching center (MSC) and/or a packet data serving node (PDSN). The one or more switches or gateways may then interface with one or more signaling and/or transport networks. As examples, an MSC may interface with the public switched telephone network (PSTN), while a PDSN may interface with one or more core packet data networks and/or the Internet. As such, mobile stations can typically communicate over the one or more signaling and/or transport networks from anywhere inside the coverage area of one or more base stations, via the base station(s), a BSC, and a switch or gateway such as an MSC and/or PDSN.

In WiMAX, data communications between a mobile station and a base station (i.e. a base station, or combinations of one or more base stations and a BSC) are formatted as Orthogonal Frequency-Division Multiplexed (OFDM) symbols, which are further organized into data frames. As some WiMAX systems employ Transmit Division Duplexing, all base stations in a given market typically begin their transmissions at the same. In particular, the base stations in a given coverage area all begin transmitting each frame at substantially the same time, a concept which is referred to herein as "frame-start synchronization." As there is a five millisecond (ms) frame interval (i.e., each frame has a duration of five ms), this means that the transmitters of each base station turn off and on twenty times per second.

To achieve frame-start synchronization, existing WiMAX base stations all receive a highly-accurate and stable timing signal that is available via a Global Positioning System (GPS) satellite. Since base stations may be of varying distances from a GPS satellite, the delay experienced by a GPS timing signal between the GPS satellite and different base stations may vary as well. Accordingly, each WiMAX base stations typically apply an offset to the GPS reference signal that is based on the delay between the base station and the GPS satellite. By adjusting the GPS timing signal as such, nearby WiMAX base stations are essentially using the same timing signal to control their frame transmissions, and thus are able to synchronize frame-start timing with each other.

OVERVIEW

In order to synchronize transmissions with nearby WiMAX base stations, existing WiMAX base stations rely on a highly-accurate and stable reference signal to stabilize their respective base station's transmitter. Existing WiMAX base stations typically include a highly-stable local oscillator, which stabilizes the base station's transmitter. This local oscillator is typically a rubidium oscillator, although any type of oscillator providing the required accuracy may be employed. Compliance with FCC requirements requires that the local oscillator provide a high degree of signal stability for transmissions. Specifically, to meet the FCC requirements for stability, a WiMAX base station must generate a radio frequency (RF) signal with a degree of precision around 50 parts-per-billion (ppb). Maintaining this accuracy over time can be a challenge, as local oscillators tend to drift due to factors such as temperature fluctuation.

In practice, existing WiMAX base stations typically use a Global Positioning System (GPS) signal to calibrate the local oscillator in compliance with the FCC requirements. In particular, a GPS reference signal typically includes a highly-accurate 10.23 MHz frequency pulse. As such, the local oscillator at a base station can be phase-locked to the GPS reference signal and used to stabilize the base-station transmitter. Thus, existing WiMAX base stations rely on GPS for both frame-start synchronization and local-oscillator stabilization. Existing WiMAX base stations may also use a GPS signal for a number of other purposes. More specifically, in addition to using GPS (1) to stabilize a local oscillator and (2) for frame-start synchronization, existing WiMAX base stations typically (3) acquire time-of-day information from a GPS signal, which helps the base station to accurately report events to a service provider's network operations center, and (4) use the GPS signal to determine geographic location.

Relying on a GPS signal can present a problem for a base station, as acquiring a GPS signal typically requires a line-of-sight view of a GPS satellite, which is not available in many locations. Accordingly, exemplary methods and systems are provided herein that may help a WiMAX base station to provide WiMAX service without receiving a GPS signal.

In a first aspect, exemplary embodiments are disclosed herein that may help a macro-network base station to determine its location when a GPS signal is inaccessible to the base station. In particular, an exemplary method may involve a macro-network base station that is located within a given telecommunications market: (i) receiving a plurality of FM radio signals, wherein each of the FM radio signals is broadcast at a certain broadcast frequency by an FM radio station in the given telecommunications market; (ii) for each received FM radio signal, determining an angle of arrival of the FM radio signal at the base station; (iii) sending a location request to a network operations center, wherein the location request comprises the broadcast frequency and the determined angle of arrival for each of the FM radio signals; and (iv) receiving a response to the location request from the network operations center, wherein the response indicates the geographic location of the first base station, and wherein the broadcast frequency and the determined angle of arrival for each of the FM radio signals are both used as a basis to determine the geographic location.

Another exemplary method may be carried out by an entity in a service provider's core network in order to facilitate location determination for a base station that does not have access to a GPS signal. The core-network component preferably serves a macro network that provides service in a coverage area that overlaps with one or more telecommunications markets. The exemplary method involves the core-network entity: (i) receiving a location request from a base station in the macro network, wherein the location request comprises: (a) a plurality of FM-station identifiers, wherein each FM-station identifier corresponds to an FM radio station, and (b) for each FM-station identifier, an angle of arrival at the base station of an FM radio signal that is broadcast by the identified FM radio station; (ii) determining a set of potential markets that comprises one or more telecommunications markets, wherein each potential market includes an FM radio station corresponding to each of the FM-station identifiers; (iii) iteratively applying a triangulation routine to the set of potential markets until an application of the trilateration routine in one of the potential markets produces a valid crossing point, wherein the triangulation routine is based at least in part on (a) locations of FM stations that broadcast at the reported broadcast frequencies in the given potential market and (b) the reported angles of arrival; and (iv) setting the valid crossing point as the geographic location of the base station.

Further, a core-network component is disclosed that may help to facilitate location determination for a base station when a GPS signal is inaccessible to the base station. The core-network component may include a non-transitory tangible computer-readable medium and program instructions stored on the non-transitory tangible computer-readable medium and executable by at least one processor to cause the core-network entity to: (i) receive a location request from a base station in the macro network, wherein the location request comprises: (a) a plurality of FM-station identifiers, wherein each FM-station identifier corresponds to an FM radio station, and (b) for each FM-station identifier, an angle of arrival at the base station of an FM radio signal that is broadcast by the identified FM radio station; (ii) determine a set of potential markets that comprises one or more telecommunications markets, wherein each potential market includes an FM radio station corresponding to each of the FM-station identifiers; (iii) iteratively apply a triangulation routine to the set of potential markets until an application of the trilateration routine in one of the potential markets produces a valid crossing point, wherein the triangulation routine is based at least in part on (a) locations of FM stations that broadcast at the reported broadcast frequencies in the given potential market and (b) the reported angles of arrival; and (iv) set the valid crossing point as the geographic location of the base station.

In a second aspect, exemplary embodiments are disclosed herein that may help a base station to stabilize its local oscillator when a GPS signal is inaccessible to the base station. In particular, an exemplary method may involve a first base station in a macro network: (i) receiving an FM radio signal from an FM station, wherein the first base station and the FM station are both located in a given telecommunications market, and wherein the first base station comprises a local oscillator; (ii) the first base station phase-locking the local oscillator to the FM radio signal; (iii) the first base station periodically receiving phase-error indications, wherein each received phase-error indication indicates phase drift of the FM radio signal; and (iv) the first base station using each received phase-error indication to adjust the phase of the local oscillator in order to account for phase drift of the FM radio signal.

Further, a macro-network base station is disclosed that may be configured to stabilize its local oscillator when a GPS signal is inaccessible to the base station. The base station may include: (i) a macro-network communication interface; (ii) an FM receiver configured to receive one or more FM radio signals; (iii) a local oscillator; and (iv) program instructions stored in a tangible computer readable medium and executable by at least one processor to: (a) tune the FM receiver to an FM radio signal that is broadcast by an FM station, wherein the base station and the FM station are both located in a given telecommunications market; (b) phase-lock the local oscillator to the FM radio signal; (c) periodically receive phase-error indications, wherein each received phase-error indication indicates phase drift of the FM radio signal; and (d) use each received phase-error indication to adjust the phase of the local oscillator in order to account for phase drift of the FM radio signal.

Another exemplary method may be carried out by an entity in a service provider's core network, such as a network operations center, in order to facilitate local-oscillator stabilization at a base station that does not have access to a GPS signal. The method involves the core-network entity: (i) receiving a phase-error indication for each of one or more FM radio signals in a given telecommunications market; and (ii) for each of the one or more FM radio signals the core-network entity: (a) identifying one or more base stations that are using the FM radio signal as a reference signal for local-oscillator stabilization; and (b) sending the phase-error indication for the FM radio signal to each identified base station.

The core-network entity may receive the phase-error information that allows the core-network entity to provide base stations with phase-error indications from one or more "in-market broadcast monitors" (IMBMs). In another exemplary embodiment, an IMBM is disclosed that may be installed in a given telecommunications market to monitor and report phase drift to the network operations center. In particular, an exemplary IMBM may include (i) at least one FM receiver configured to receive one or more FM radio signals in the given telecommunications market; (ii) a GPS receiver configured to receive a GPS signal; and (iii) program instructions stored in a tangible computer readable medium and executable by at least one processor to: (a) cause the FM receiver to receive an FM radio signal that is broadcast in the given telecommunications market; (b) cause the GPS receiver to receive a GPS signal; (c) divide down the FM radio signal to generate a comparison signal; (d) determine a phase difference between the comparison signal and the GPS signal; and (e) provide a phase-error indication for use by one or more base stations in the macro network, wherein the phase-error indication comprises an indication of the phase difference between the comparison signal and the FM radio signal.

Another exemplary method may be carried out by an IMBM to determine and provide phase-error indications for the FM radio signals in the telecommunications market in which the IMBM is located. The method may involve the IMBM: (a) receiving an FM radio signal that is broadcast in the given telecommunications market; (b) receiving a GPS signal; (c) dividing down the FM radio signal to generate a comparison signal; (d) determining a phase difference between the comparison signal and the GPS signal; and (e) providing a phase-error indication for use by one or more base stations in the macro network, wherein the phase-error indication comprises an indication of the phase difference between the comparison signal and the FM radio signal.

In a third aspect, exemplary embodiments are disclosed herein that may help a base station to synchronize its frame-start timing with a nearby base station when a GPS signal is inaccessible to the base station. In particular, an exemplary method may involve a second base station in a macro network: (a) receiving a first signal from a first base station in the macro network, wherein the first signal comprises frames, and wherein the first signal further comprises an identifier of the first base station; (b) synchronizing a frame-start timing signal with the frames in the first signal; (c) determining a time-of-flight delay between the first base station and the second base station; (d) adjusting phase of the frame-start timing signal to account for the time-of-flight delay between the first base station and the second base station; and (e) transmitting a second broadcast signal that is formatted into frames, wherein the second base station uses the frame-start timing signal to control the timing of the frames in the second signal.

Further, a macro-network base station is disclosed that may be configured to synchronize its frame-start timing with a nearby macro-network base station when a GPS signal is inaccessible to the macro-network base station. The macro-network base station is configured to communicate with client devices in its coverage area via a broadcast signal comprising frames, and includes: (i) a macro-network communication interface; (ii) a backhaul communication interface; and (iii) program instructions stored in a tangible computer readable medium and executable by at least one processor to: (a) cause the macro-network communication interface to receive a first broadcast signal from a nearby base station in the macro network, wherein the first broadcast signal comprises a plurality of frames, and wherein the first signal further comprises an identifier of the first base station; (b) synchronize a frame-start timing signal with receipt of the frames in the first broadcast signal; (c) determine a time-of-flight delay experienced by the first broadcast signal between transmission of the first broadcast signal from the nearby base station and receipt of the first broadcast signal; (d) adjust a phase of the frame-start timing signal to account for the determined time-of-flight delay; and (e) cause the macro-network base station transmit a second broadcast signal that comprises frames, wherein the frame-start timing signal is used to control the timing of the frames in the second signal.

Another exemplary method may be carried out by an entity in a service provider's core network in order to facilitate frame-start synchronization at a base station that does not have access to a GPS signal. The method involves a core-network component: (a) receiving a request from a second base station for a time-of-flight delay between a first base station and the second base station, wherein the request includes (i) an identifier of a first base station and (ii) a the geographic location of the second base station, and wherein the second base station is configured to use the time-of-flight delay to synchronize a frame-start timing signal with frames in a broadcast signal of the first base station; (b) using the identifier of the first base station as a basis to determine the geographic location of the first base station; (c) based at least in part on (i) the received geographic location of the second base station and (ii) the determined geographic location of the first base station, determining a distance between the first base station and the second base station; (d) using the distance between the first base station and the second base station as a basis to determine the time-of-flight delay experienced by a broadcast signal between the first base station and the second base station; and (e) sending an indication of the time-of-flight delay to the second base station.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which:

FIG. 9 is a flow chart illustrating a method that may be implemented by an in-market broadcast monitor, according to an exemplary embodiment;

DETAILED DESCRIPTION

Exemplary methods and systems may generally be implemented to allow a macro-network base station without access to a GPS signal to provide some or all of the functionality for which existing macro-network base stations typically rely on GPS. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

Exemplary embodiments of the invention may be described herein by way of example, with specific reference to Worldwide Interoperability for Microwave Access (WiMAX) systems. However, it is anticipated that exemplary embodiments may be implemented in any type of macro network, including macro networks operating under air-interface protocols other than WiMAX. For example, exemplary methods and systems may also be employed in the context of Long Term Evolution (LTE) systems such as those currently standardized by the $3^{rd}$ Generation Partnership Project (3GPP), and those in development (e.g., LTE Advanced) or yet to be developed. Accordingly, descriptions of exemplary embodiments relating to WiMAX systems should not be construed as limiting their applicability to WiMAX or any other particular type of macro network.

I. Exemplary Macro-Network Architecture

Figure 1A:
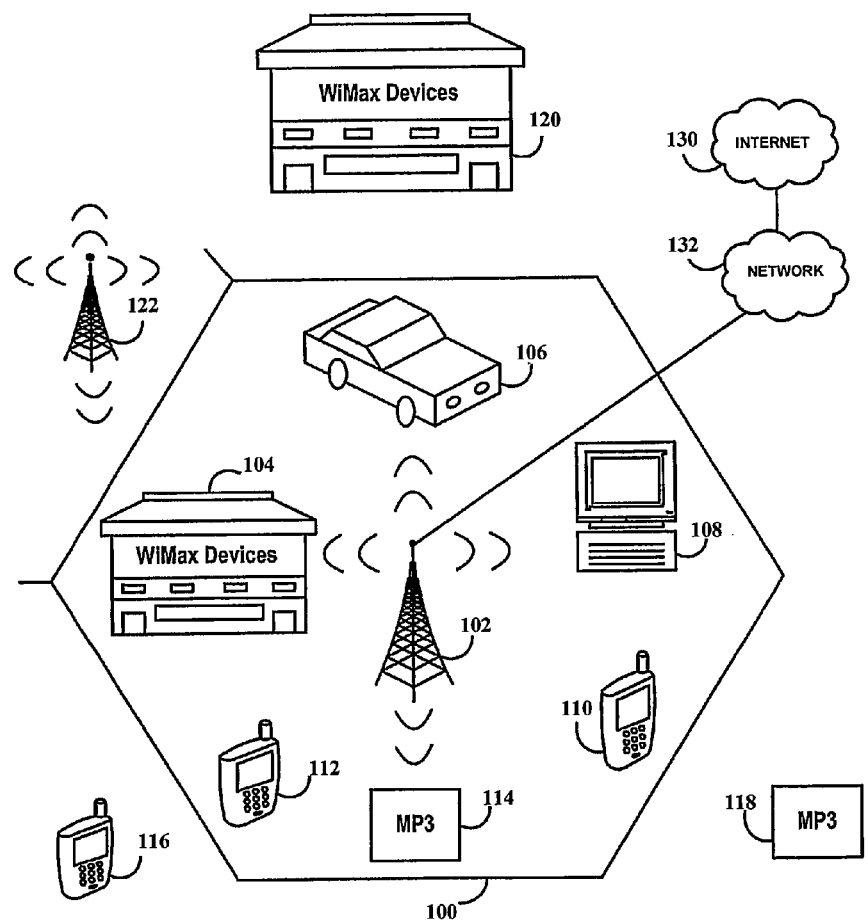
FIG. 1A is block diagram of a coverage area where service is available from a macro-network base station, according to an exemplary embodiment.

FIG. 1A is block diagram of a coverage area 100 where service is available from a macro-network base station, which in the illustrated example is a WiMAX base station 102. Also shown are a plurality of client devices that may compete for the resources of the WiMAX base station 102. The client devices may take the form of, for example, WiMAX-capable devices located in a building or home 104, such as computer, appliance or cell phone, WiMAX-capable devices located in an automobile 106, a portable computer 108, a cellular telephone 110, a personal digital assistant 112, an MP3 player 114, another cell phone 116, another MP3 player 118 and/or various WiMAX-capable devices located within an office building 120 such as computers, cell phones, game players, etc. Adjacent areas may be covered by other base stations, one of which is shown as base station 122.

Provided with a WiMAX connection via base station 102, a client device may engage in various types of communication. For instance, a base station 102 may provide connectivity to a packet-switched network 130 such as the Internet. Further, packet-data connectivity may be provided via a service provider's network 132 or directly. In addition to packet-data connectivity, a WiMAX connection may also provide access to other services such as voice-over-IP (VoIP), among others.

It should be understood that references to a WiMAX base station, such as base station 102, are representative of various types of entities, and generally apply to any macro-network entity configured to provide WiMAX service and/or to provide service under another protocol. Such entities may include, but are not limited to, commercial base stations that are installed by service providers, as well as base stations that a subscriber (such as a private consumer or small business) may install in their home or place of business, such as "femtocells." Femtocells are essentially low-power, low-capacity versions of a macro base station, which may be installed to address gaps in macro-network coverage (e.g. in buildings) and for other reasons. Femtocells may also be referred to as femto base stations, femto base stations, picocells, pico base stations, microcells, micro base stations, and by other names, such as Internet base stations or perhaps low-cost Internet base stations (LCIBs). With respect to the term LCIB, low-cost is not used as a limiting term; that is, devices of any monetary cost may be categorized as LCIBs, though most LCIBs typically will be less expensive on average than most macro-network base stations.

A WiMAX base station 102 typically provides wireless service to client devices by transmitting a signal that is formatted into "frames." As the signal from an exemplary macro-network base station is preferably formatted into frames, it essentially is a string of consecutive frames that are transmitted one after another by the base station.

Figure 1B:
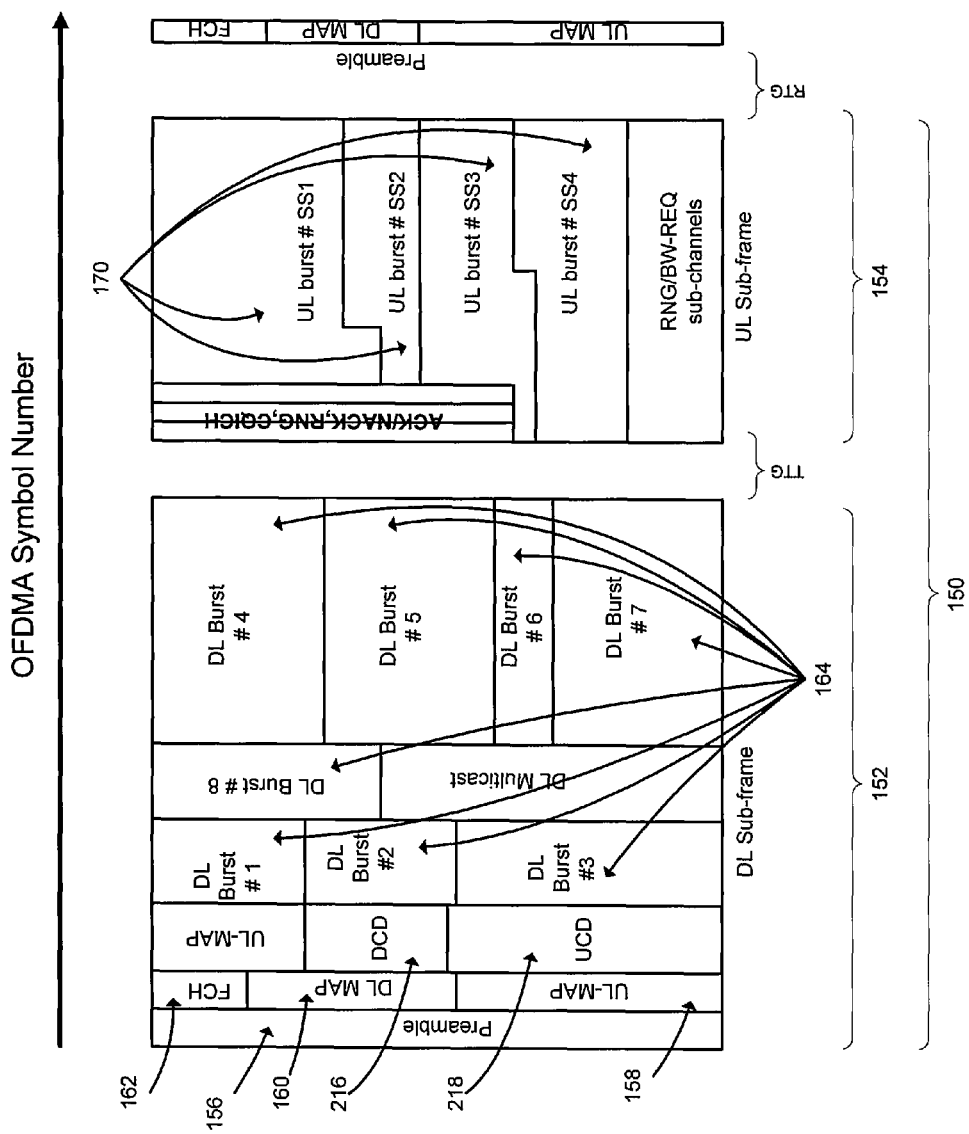
FIG. 1B is a block diagram illustrating the structure of a typical WiMAX frame, according to an exemplary embodiment.

FIG. 1B is a block diagram illustrating the structure of a typical WiMAX frame 150. Each frame 150 includes a downlink (DL) sub-frame 152 and an uplink (UL) sub-frame 154, which together provide various sub-channels and zones for communicating both overhead information (e.g., for session setup, etc.) and user traffic data on the downlink and uplink, respectively. The DL sub-frame 152 typically includes a preamble 156, which is followed by an uplink map (UL-MAP) 158, a downlink map (DL-MAP) 160, a Frame Control Header (FCH) 162, and various DL burst messages 164. Among other information, the UL sub-frame 154 typically includes UL bursts 170. Under WiMAX, the preamble 156, UL-MAP 158, DL-MAP 160, and other such overhead information may be received by any client device within range of the transmitting base station. On the other hand, DL Bursts and UL Bursts typically include user traffic intended for specific client devices, and thus are available only to those clients for which they are intended.

In a further aspect of WiMAX, nearby base stations are required to synchronize frame transmissions with each other. In an exemplary embodiment, the preamble 156 is typically the first OFDM symbol in each WiMAX frame 150. Therefore, to synchronize their frame transmissions, nearby WiMAX base stations each begin transmitting the preamble of every WiMAX frame at substantially the same time. To accomplish frame-start synchronization in practice, existing WiMAX base stations receive a highly-accurate and stable 1 pulse/sec (pps) GPS timing signal that, after each base station has adjusted for the respective time-of-flight delay between the base station and GPS satellite, provides a common reference signal for nearby base stations. Accordingly, the transmission of WiMAX frames in each base station may then be edge-triggered by the leading edge of the 1 pps GPS timing signal. In practice, as the duration of each frame is much less than one second, every $200^{th}$ frame is edge-triggered by the 1 pps GPS timing signal.

Figure 2:
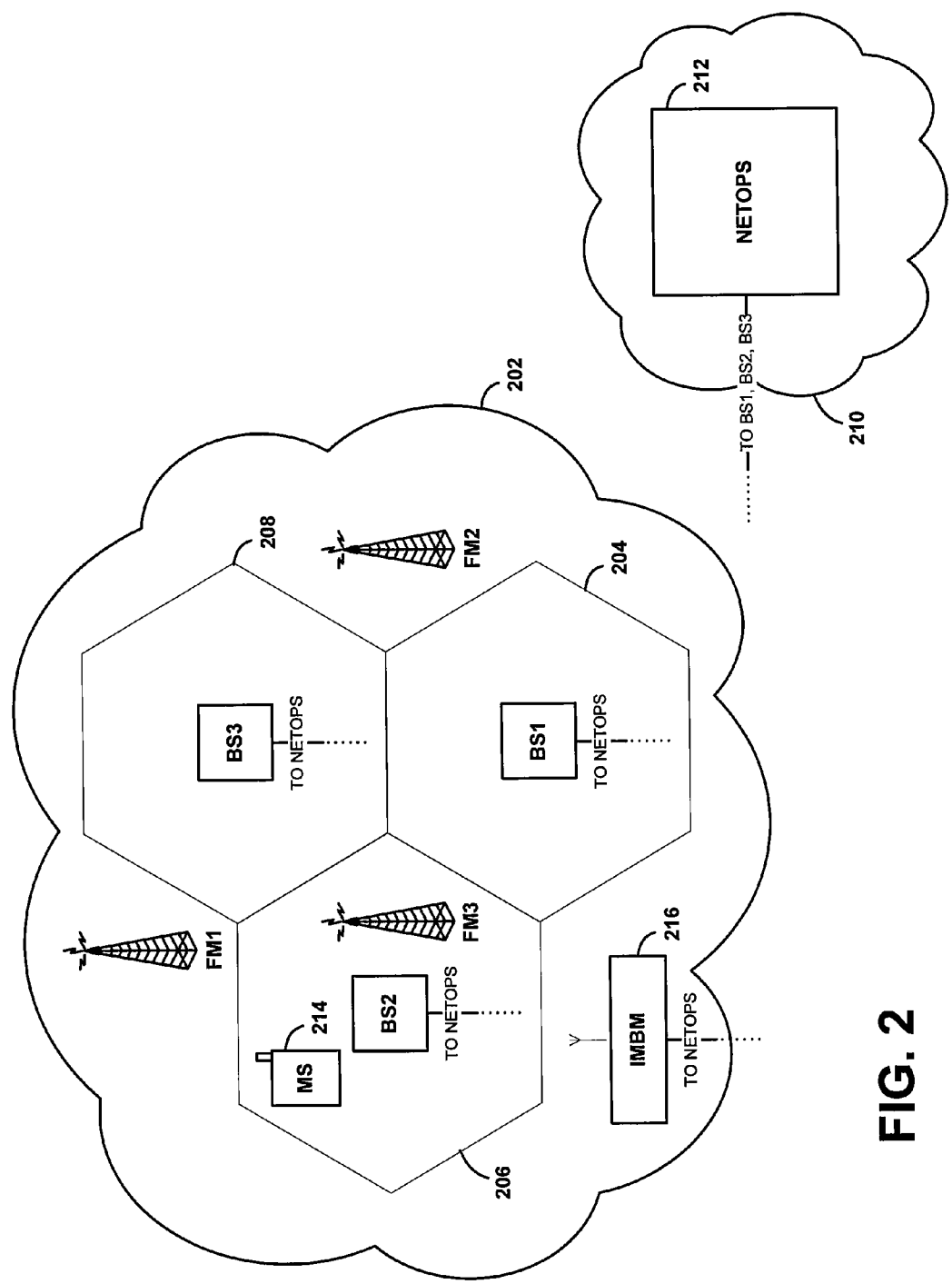
FIG. 2 is a block diagram illustrating a telecommunications market, in which an exemplary embodiment may be implemented.

FIG. 2 is a block diagram illustrating a telecommunications market 202, in which an exemplary embodiment may be implemented. A "telecommunications market" may be a defined geographic area that is served by a given set of FM radio stations. For example, a telecommunications market may be a geographic area such as a city, county, state, or portions thereof, which is served by a common set of FM radio stations. Alternatively, a telecommunications market may include multiple cities, multiple counties, or multiple states, which are all served by a common set of FM radio stations. As shown, telecommunications market 202 includes a number of FM radio stations FM1, FM2, and FM3. Each of these FM stations broadcasts an FM radio signal that can generally be received throughout the telecommunications market 202.

As further shown, a macro-network is configured to provide wireless communication service in a coverage area that overlaps with at least a portion of telecommunications market 202. In particular, a number of macro-network base stations BS1, BS2, and BS3 provide service in their respective coverage areas 204-208, which are each located within telecommunications market 202. It should be understood that the coverage area of a macro network is defined by the broadcast range of the base station in the macro network, and that the geographic area of a telecommunications market is defined by the broadcast range of a set of FM radio stations. Thus, while the coverage area of a macro network and a telecommunications market may overlap, as in FIG. 2, these geographic areas are defined independently from one another.

To provide wireless service, each macro-network base station BS1-BS3 is communicatively coupled to a service provider's core network 210, which includes a Network Operations Center (NetOps) 212. Among other functions, NetOps 212 may be configured to coordinate the operation of base stations in the macro network, so that substantially contiguous wireless service can be provided throughout the coverage area of the macro network. Each macro-network base station BS1-BS3 is typically configured to engage in wired (e.g. Ethernet) and/or fiber optic and/or microwave communications with NetOps 212 via a backhaul connection to the service provider's core network 210. Alternatively, a macro-network base station may communicate with NetOps 212 via a packet-data network such as the Internet.

In the illustrated arrangement, base station BS1 is a standard macro-network base station, which includes a GPS interface, and relies on a GPS signal for various functionality. In particular, base station BS1 may use GPS to (i) determine its geographic location, (ii) stabilize its local oscillator, and (iii) synchronize frame transmissions with nearby macro-network base stations. As such, frame transmissions by base station BS1 may be edge-triggered to a 1 pulse per second (pps) GPS timing signal. Further, since GPS provides a highly-accurate 10.23 MHz signal that is traceable to a stratum 1 atomic clock, base station BS1 may use this 10.23 MHz signal as a reference signal stabilizing its local oscillator and frame-start synchronization with nearby WiMAX base stations.

WiMAX base station BS2, on the other hand, is configured to operate according to an exemplary embodiment, and as such, is configured to provide WiMAX service without receipt of a GPS signal. To do so, base station BS2 may be configured to perform an initial setup routine in which base station BS2 determines its geographic location, calibrates its local oscillator, and synchronizes its frame-start timing with nearby WiMAX base stations BS1 and/or BS3, all without receiving a GPS signal. Furthermore, after carrying out the initial setup routine, base station BS2 preferably switches to an operating mode in order to provide WiMAX service in coverage area 206. While in operating mode, base station BS2 preferably continues to stabilize its local oscillator and synchronize frame transmissions without receiving a GPS signal.

A. Exemplary Macro-Network Base Station

Figure 3:
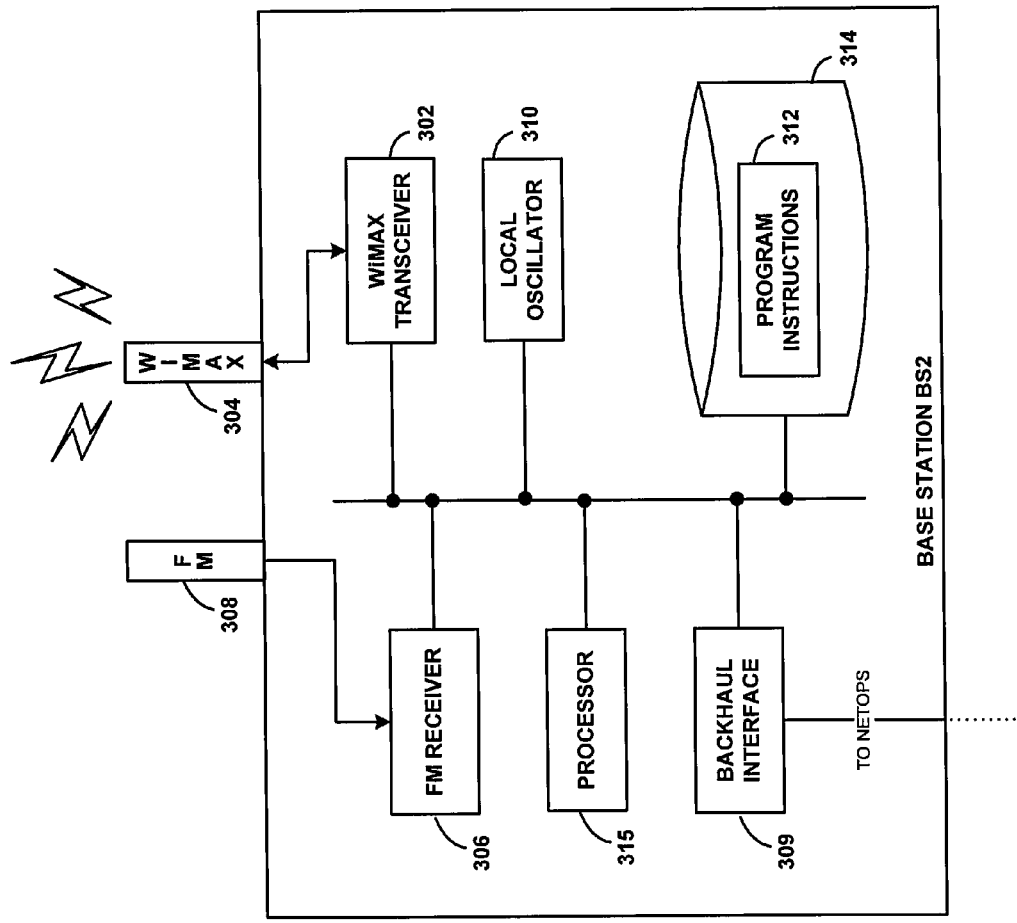
FIG. 3 is a block diagram illustrating a base station, according to an exemplary embodiment.

FIG. 3 is a simplified block diagram illustrating exemplary base station BS2 in greater detail. As shown, base station BS2 includes a WiMAX transceiver 302 and an associated antenna 304 for providing WiMAX service, as well as a separate FM receiver 306 and an associated antenna 308 for receiving FM radio signals. Further, base station BS2 includes a backhaul interface 309 for communicating with the service provider's core network (and entities therein, such as NetOps 212). Base station BS2 also includes a local oscillator 310, and program instructions 312 stored on a computer-readable medium 314 (i.e., data storage) that are executable by at least one processor 315 to carry out the base-station functionality described herein.

As noted, base station BS2 is configured to carry out a setup routine. During the setup routine, base station BS2 preferably synchronizes its frame transmissions with nearby base station BS1. By synchronizing its frame-start timing with base station BS1, which is already synchronized with other nearby base stations, base station BS2 will effectively synchronize its frame-start timing with the other nearby base stations as well.

In an exemplary embodiment, base station BS2 is configured to synchronize with base station BS1 by initially tuning to the broadcast signal from base station BS1, and then generating a frame-start timing signal that is synchronized with the frames in the broadcast signal from BS1. In particular, the frame-start timing signal may include periodic frame-start triggers that are aligned with the receipt of the preambles in frames of the broadcast signal. Once generated as such, the phase of the periodic frame-start triggers is aligned with the receipt of the frames at base station BS2. However, to synchronize frame-start timing with base station BS1, base station BS2 needs to align the phase of the frame-start triggers with the transmission of frames by base station BS1. Accordingly, base station BS2 may determine the time-of-flight delay between base station BS1 and base station BS2, and adjust the phase of the frame-start timing signal to account for the time-of-flight delay, thereby synchronizing the frame-start triggers with the transmission of frames by base station BS1.

In order to calculate the time-of-flight delay, base station BS2 needs to determine its own location so that the distance between it and base station BS1 can be determined. Accordingly, during the setup routine, base station BS2 may also be configured to determine its location without relying upon receipt of a GPS signal. In an exemplary embodiment, to determine its location without GPS, base station BS2 may coordinate with NetOps 212. For example, base station BS2 may determine an angle-of-arrival (AoA) at base station BS2 for each FM station FM1-FM3 (i.e., the angle-of-arrival of the signal broadcast by the respective FM station), and then report this angle-of-arrival data to NetOps 212. NetOps 212 is preferably configured to use this information to determine the geographic location of base station BS2. As such, once base station BS2 sends NetOps 212 the angle-of-arrival information for nearby FM stations FM1-FM3, NetOps 212 may provide base station BS2 with its geographic location.

Furthermore, in order to generate a stable frame-start timing signal that can be relied upon for frame-start synchronization, base station BS2 needs a highly stable local oscillator 310. Accordingly, during the setup routine, base station BS2 is preferably configured to stabilize its local oscillator using an FM radio signal as a reference, rather than a GPS signal. For example, base station BS2 may stabilize its local oscillator 310 by phase-locking its local oscillator to an FM signal from an FM station, such as the FM signal broadcast by one of FM stations FM1, FM2, and FM3.

In a further aspect, after base station BS2 ends the setup routine and switches to operating mode, base station BS2 preferably continues to stabilize its local oscillator 310 using the FM signal. As noted above, base station BS2 includes an FM receiver 306 in addition to its WiMAX interface (i.e., transceiver 302 and antenna 304). Therefore, once base station BS2 switches to operating mode and begins using its WiMAX interface to provide service in coverage area 206, base station BS2 can continue to receive and use an FM radio signal as a reference signal for local-oscillator stabilization.

Importantly, the phase drift of FM radio signals is such that if an FM radio signal was used for local oscillator stabilization and phase drift was not accounted for, the local oscillator 310 would likely fail to meet FCC requirements. Therefore, base station BS2 is preferably configured to adjust its local oscillator periodically in order to account for phase drift of the FM radio signal. To do so, base station BS2 may periodically receive phase-error information from NetOps, which indicates phase error of the FM signal that base station BS2 is using to stabilize its local oscillator 310.

In a further aspect, an exemplary base station BS2 may periodically (e.g., once a week or once a month) shut down and repeat the calibration/setup process. A service provider may deem periodic shutdown to repeat the setup routine appropriate to help prevent the stability of the local oscillator from becoming unacceptable and/or to help prevent frame-start timing from becoming out of sync with nearby base stations. A service provider may also implement a periodic shutdown and repetition of the setup routine for other reasons, without departing from the scope of the invention.

Configured as described above, an exemplary macro-network base station BS2 is able to: (i) determine its geographic location, (ii) stabilize its local oscillator 310, and (iii) synchronize its frame-start timing with nearby macro-network base stations, without receipt of a GPS signal. It should be understood, however, that it is within the scope of the invention that a base station use a GPS signal for some of this functionality.

B. Exemplary In-Market Broadcast Monitor

Again referring to FIG. 2, NetOps 212 is preferably configured to provide macro-network base stations with phase-error information for FM stations in their respective telecommunications markets. In order that NetOps 212 can provide phase-error information for the FM stations in various telecommunications markets, a service provider may install an in-market broadcast monitor (IMBM) in each telecommunications market 202. An exemplary IMBM may be configured to receive FM radio signals from FM stations in the market in which the IMBM is located, and to periodically determine the phase errors of the FM radio signals. The IMBM may then report the determined phase errors to NetOps, so that NetOps in turn may provide phase-error information to base stations that are using the FM radio signals as references for local oscillator stabilization. For example, IMBM 216 is installed in telecommunications market 202, and is preferably configured to receive FM radio signals from stations FM1-FM3, to generate phase-error information for each of the corresponding FM radio signals, and to periodically send the phase-error information to Netops 212.

Figure 4:
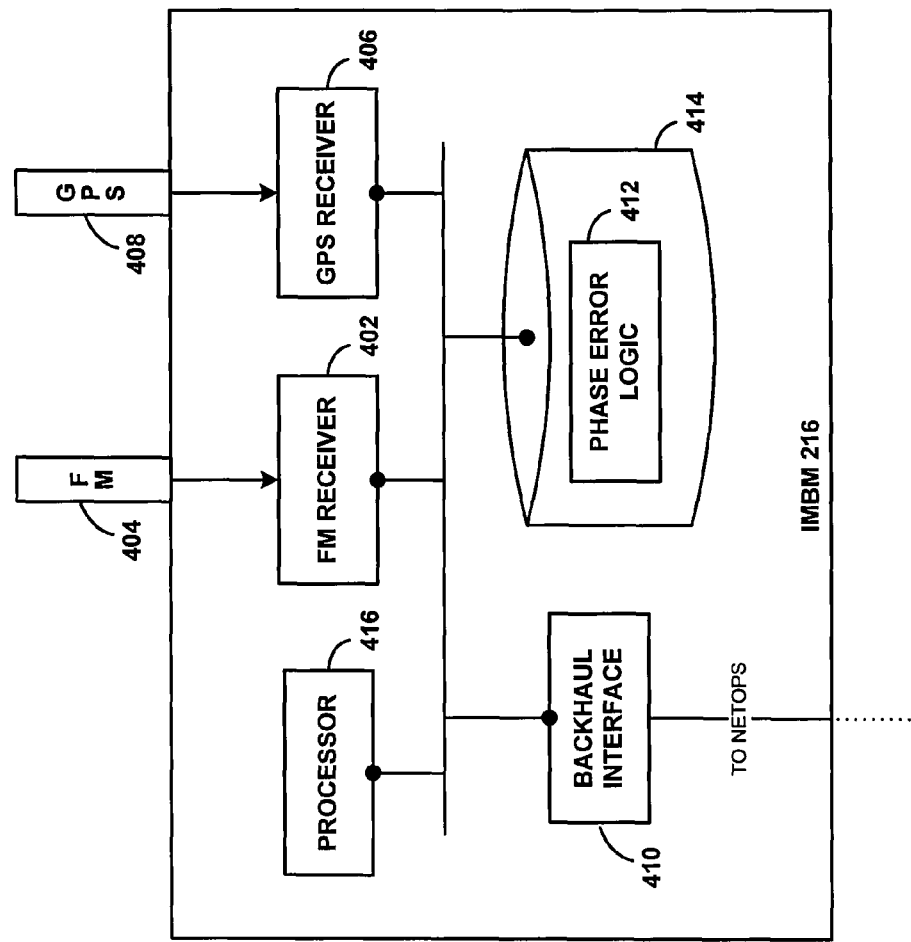
FIG. 4 is a block diagram illustrating an in-market broadcast monitor, according to an exemplary embodiment.

FIG. 4 is a simplified block diagram illustrating IMBM 216 in greater detail. To determine phase-error information for the FM radio signals in telecommunications market 202, IMBM 216 may include one or more FM receivers 402 (and one or more corresponding antennas 404) for receiving the FM radio signals that are broadcast by FM stations FM1-FM3. Further, IMBM 216 includes a GPS receiver 406 (and corresponding antenna 408), as well as a backhaul interface 410 for communicating with NetOps 212 (and possibly with other entities on the service provider's core network 210 as well).

In an exemplary embodiment, IMBM 216 is preferably installed in a location where line-of-sight communication with a GPS satellite is possible. The IMBM 216 may then use the 10.23 MHz signal that GPS provides as a stable reference signal for determining phase error in FM radio signals. In particular, the IMBM 216 may generate a comparison signal by dividing down each FM radio signal in telecommunications market 202 such that when the actual frequency of the FM radio signal is equal to the listed or identified frequency of the broadcasting FM station, the frequency of the comparison signal will be 10.23 MHz. IMBM 216 may then determine the phase difference between the comparison signal and the stable GPS 10.23 MHz signal that is known to be accurate, and determines the phase error of the FM signal therefrom. Accordingly, the IMBM 216 may include phase-error logic 412 (i.e., program instructions), which is stored on a computer-readable medium 414 (i.e., data storage), and executable by at least one processor 416 to determine phase-error information for received FM radio signals. Furthermore, IMBM 216 may also include program instructions not explicitly shown, which are stored on a computer-readable medium and executable to carry out functions described herein.

As noted, IMBM 216 may be configured to provide phase-error information for multiple FM stations in a given market. To do so, an IMBM may be equipped with a separate antenna to receive each FM station in its telecommunications market, so that the IMBM can determine phase-error information for all stations in the market simultaneously. Alternatively, the IMBM may determine phase-error information for one FM station at a time, and periodically cycle through all the FM stations that it monitors. In such an embodiment, it is possible that the IMBM may include one or more FM antennas. And as another alternative, an IMBM may group the FM stations it monitors into a number of subsets and cycle through the subsets, determining phase-error information for all stations in a given subset simultaneously. For example, an IMBM monitoring nine FM stations in a given market may be equipped with three FM antennas, and accordingly, may divide the nine FM stations into three subsets of three FM stations each. The IMBM may then determine phase-error information for the three FM stations in a given subset simultaneously, and cycle between the three subsets. Other IMBM configurations for monitoring multiple FM stations in a given market are also possible.

C. Exemplary Network Operations Center

Figure 5:
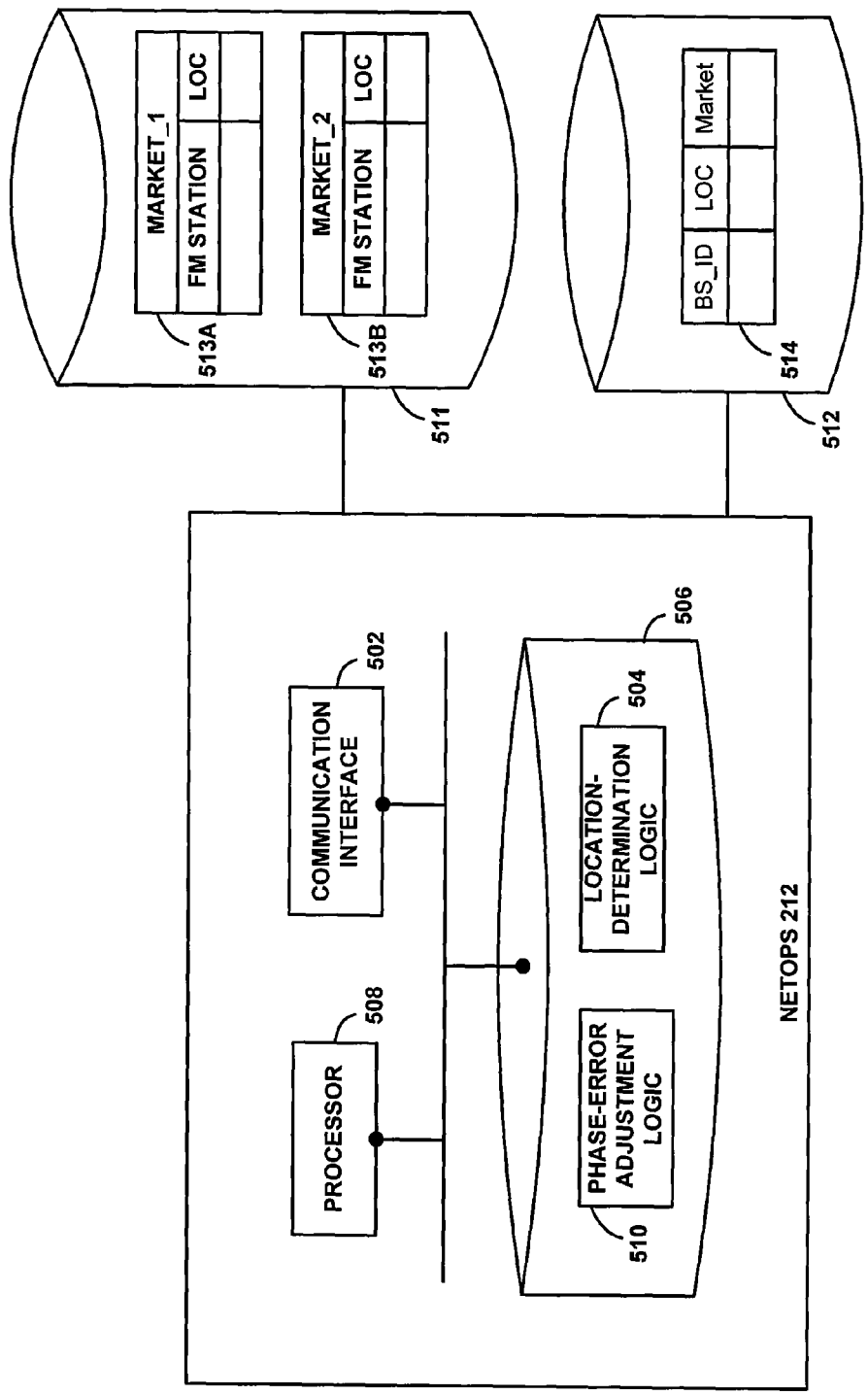
FIG. 5 is a block diagram illustrating a network operations center, according to an exemplary embodiment.

FIG. 5 is a simplified block diagram illustrating NetOps 212 in greater detail. According to an exemplary embodiment, NetOps 212 may be configured to facilitate the operation of a base-station that does not receive a GPS signal. NetOps 212 may accordingly assist base station BS2 in various functions that might otherwise require that base station BS2 receive a GPS signal. For example, NetOps may assist base station BS2 in location determination, local-oscillator stabilization, and/or frame-start synchronization.

As shown, NetOps 212 includes a communication interface 502 via which NetOps 212 communicates with IMBM 216 and base stations BS1-BS3. While only one communication interface is shown, it should be understood that NetOps may alternatively include separate communication interfaces for communicating with IMBM 216 and base stations BS1-BS3.

In addition, NetOps 212 includes location-determination logic 504 (i.e., program instructions), which is stored on a computer-readable medium 506 (i.e., data storage), and executable by at least one processor 508 to determine the location of the base station. More specifically, to facilitate location determination by base station BS2, NetOps 212 may be configured to receive angle-of-arrival data from base station BS2, which provides the angle-of-arrival at base station BS2 for various FM radio signals in the market in which base station BS2 is located. NetOps 212 may then use the angle-of-arrival data to determine the location of base station BS2. In particular, NetOps may be configured to use the angle-ofarrival data and the locations of the FM stations from which the FM radio signals originated to perform a triangulation-based location determination technique.

To facilitate determining the locations of various FM stations, NetOps may include or have access to a database 511 that stores FM-station location data on a per-market basis. In particular, database 511 may include a table for each of a plurality of telecommunications markets, with the table for a given market indicating the location of each FM station in the market. For instance, database 511 includes table 513A, which provides the location (LOC) of each FM station in Market_1, and table 513B, which provides the location (LOC) of each FM station in Market_2. Tables 513A and 513B may identify an FM station using various identifiers, such as the broadcast frequency or the call letters of the FM station.

NetOps 212 also includes phase-error adjustment logic 510, which is executable to: (a) acquire phase-error information for the FM stations in a given market from the IMBM 216 in that market, and (b) distribute FM-signal phase-error information to the appropriate base stations. Furthermore, NetOps 212 may also include program instructions not explicitly shown, which are stored on a computer-readable medium and executable to carry out functions described herein.

To facilitate sending periodic phase-error indications to the appropriate base stations, NetOps 212 may include or have access to a database 512 that indicates which base stations are relying on which FM stations for local-oscillator stabilization. In order that this database be populated, when a base station selects an FM radio signal to use for local oscillator stabilization, the base station preferably reports the FM station that broadcasts the FM radio signal to NetOps 212, along with its own base station identifier (BS_ID). The FM station may be identified by the base station using various techniques. For instance, the base station may indicate the broadcast frequency (e.g., 99.1 MHz) or the call letters of the FM station. NetOps then stores this information in database 512 so that it can later determine the FM station that the base station is relying upon. More specifically, NetOps 212 may create an entry in the database 512 for the market in which the base station is located, which associates the BS_ID of the base station with the FM station.

Provided with database 512, NetOps 212 may determine which mobile stations to send phase-error indications to whenever NetOps 212 receives updated phase-error information from IMBM 216. In particular, when NetOps 212 receives updated phase-error information for a certain FM station, NetOps 212 may access the database 512, and determine which base station or base stations in the market are using that FM station for local oscillator stabilization. For example, if NetOps receives an indication that the FM station with a 99.1 MHz broadcast frequency in a certain market has a certain phase error, then NetOps may then access the database to determine the base station or base stations which are relying upon the 99.1 MHz FM radio signal for local oscillator stabilization, and send these base stations the phase-error information for the associated FM station.

II. Exemplary Location-Determination Methods

Many location-determination techniques, such as time difference of arrival (TDOA) and various triangulation-based techniques are based upon the angles-of-arrival of multiple signals from known sources. These techniques typically involve determining the location of a receiving entity by measuring the angles at which signals arrive at the receiving entity from at least three known sources, and then subtending from the sources at the measured angles to determine a crossing point. This crossing point is thus the location of the receiving entity. In an exemplary embodiment, the location of a macro-network base station is determined using a location-determination technique based at least in part on the angles-of-arrival of FM signals from nearby FM radio stations.

Unfortunately, when a macro-network base station is initially installed, the base station does not know the locations of FM stations in the market in which it is located, and angle-of-arrival techniques typically require that the locations of the signal sources be known. Complicating this problem, FM stations are typically identified by their broadcast frequency, and broadcast frequencies are reused from market to market. This may make it difficult to determine which market a given FM station is located within, which in turn makes determining the geographic location of the FM station, as simply looking up the location of an FM station having a certain broadcast frequency may yield inconclusive results. However, in an exemplary embodiment, a WiMAX base station coordinates with NetOps to intelligently determine the respective locations of FM stations in its market, so that the angle-of-arrival-based techniques can be applied to determine the BS's location.

A. Exemplary Location Determination by a Macro-Network Base Station

Figure 6A:
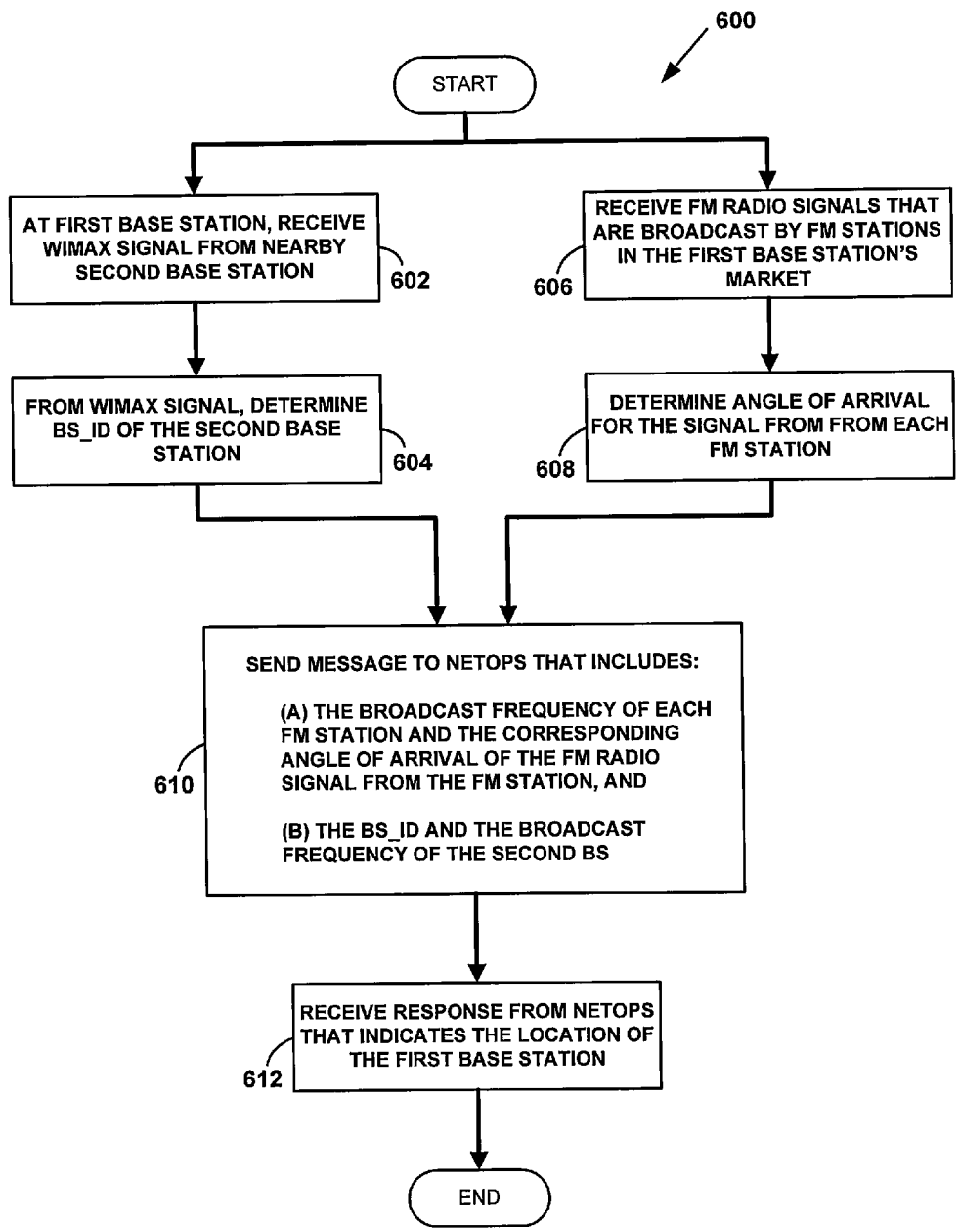
FIG. 6A is a flow chart illustrating a location-determination method that may be carried out by a macro-network base station, according to an exemplary embodiment.

FIG. 6A is a flow chart illustrating a location-determination method 600 that may be carried out by a macro-network base station, according to an exemplary embodiment. In particular, method 600 may involve a second base station searching for and receiving a broadcast signal from a first base station that is nearby, as shown by block 602. As a macro-network base station typically includes its BS_ID as overhead information in its broadcast signal (e.g., as overhead information in each WiMAX frame), the second base station may extract the BS_ID of the first base station from the received broadcast signal, as shown by block 604. Additionally, the second base station may receive FM radio signals (preferably three or more) that are broadcast by a number FM stations in the first BS's market, as shown by block 606. The second base station may then determine the angle of arrival of each FM signal, as shown by block 608.

Once the second base station has determined the identification information for the first base station, the second base station may send a message to NetOps that indicates: (a) the broadcast frequency of each FM station and the corresponding angle of arrival of the FM radio signal from the FM station, and (b) the BS_ID and the broadcast frequency of the first base station, as shown by block 610. The second base station then receives a response from NetOps that indicates its location, as shown by block 612, which NetOps has determined based upon the information provided by the second base station (e.g., the broadcast frequency and angle of arrival of each of the FM stations and/or the BS_ID and the transmission frequency of the first base station).

To carry out an exemplary method, a base station may be configured to determine the angle-of-arrival for a given FM station using various techniques, which are generally known in the art. For example, a base station may be configured to use a well-known Doppler technique in which the base station's local oscillator is offset from the incoming FM signal, and beats against the FM signal to produce an audio "beat note". The base station's FM antenna is electronically "swept" toward and away from the signal source, causing the pitch of the audio "beat note" to rise and fall. In a manner that is well known to those skilled in the art, a zero-crossing detector is then phase-synchronized with an angle "stepper" to provide the angle at which the signal is arriving at the base station. Other angle-of-arrival techniques may also be employed, without departing from the scope of the invention.

As noted, the second base station may report the BS_ID and/or the broadcast frequency of the first base station to assist NetOps in determining the market in which the base station is located. In particular, by looking up the market or markets that have a macro-network base station with the reported BS_ID and/or the reported broadcast frequency, NetOps may narrow the markets in which it searches for a match with the reported FM stations. To do so, NetOps may search for markets that have all the FM stations reported by the base station. Since FM broadcast frequencies may be reused from market to market, this search can return a number of markets. Accordingly, NetOps may narrow the markets that it searches to those that also have a macro-network base station with the reported BS_ID and/or the reported broadcast frequency.

In an alternative location-determination method, a macro-network base station may still provide NetOps with angle-of arrival data for FM stations in its market, but may not provide the identification information for a nearby base station. In such an embodiment, the base station need not search for or receive the broadcast signal from a nearby macro-network base station. Therfore, the base station may simply receive three or more FM radio signals in its market, and send a message to NetOps that identifies the broadcast frequency of each FM radio signal, along with the corresponding angle of arrival of the FM radio signal. As NetOps does not narrow the potential markets to those having a matching base station, it is possible that not identifying the nearby base station may result in more processing by NetOps. However, NetOps can still use the angle-of-arrival information to determine the location of the base station.

B. Exemplary Location-Determination Assistance by a Network Operations Center

As noted, NetOps is preferably configured to perform an angle-of-arrival-based location determination technique (i.e., a triangulation-based technique) to determine the location of a given base station. The location determination technique used by NetOps is preferably based upon the locations of the FM stations and the corresponding angle-of-arrival of each FM station's signal at the macro-network base station. In a further aspect, the location determination technique used by NetOps may also be based upon the location of a base station that is nearby the base station for which location is being determined.

In an exemplary embodiment, NetOps receives angle-of-arrival data from a base station, which preferably includes angles of arrival for at least three FM radio signals. NetOps also receives identification information for each of these FM radio signals (e.g., a listed frequency of or call letters of the FM station that broadcasts the FM radio signal). Furthermore, NetOps may receive identification information for a nearby base station (e.g., the BS_ID and/or broadcast frequency of the information). Due to re-use of the identification information for both macro-network base stations and FM radio stations, the reported identification information by itself may be insufficient to uniquely identify the telecommunications market in which the reporting base station is located, and thus insufficient to determine the location of the reporting base station.

Accordingly, NetOps may initially identify a set of potential markets in which a base station might be located. To do so, NetOps preferably determines which markets include FM stations at all the broadcast frequencies reported by the first base station. Since it is possible that a large number of potential markets may still exist even after narrowing the set to those markets that include all the FM stations identified by the base station, NetOps may be further configured to use the reported information regarding the nearby base station (e.g., the BS_ID and the broadcast frequency) to further narrow the potential markets to those that also include a base station that is assigned the reported BS_ID, and/or that operates at the reported broadcast frequency.

It should be understood that the order in which the identification information for the FM stations and the identification information for the nearby base station are used to narrow the set of potential markets may vary as a matter of engineering design choice. Therefore, in an alternative embodiment, NetOps may first narrow the set of potential markets to those in which a base station matches the reported BS_ID and broadcast frequency, and then further narrow the set to those potential markets that have all the reported FM stations.

Figure 6B:
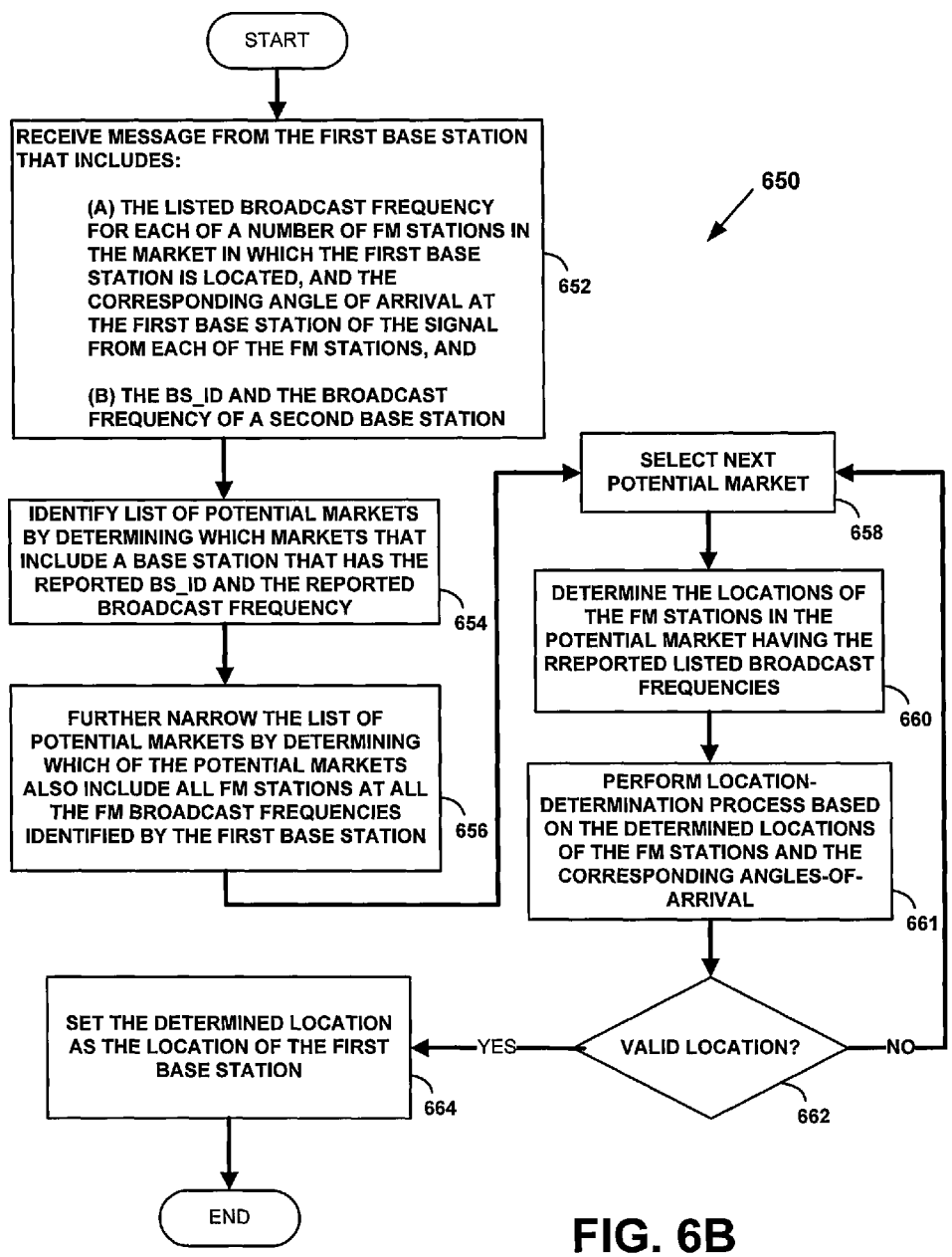
FIG. 6B is a flow chart illustrating an exemplary method that may be carried out by a network operations center to determine the location of a macro-network base station, according to an exemplary embodiment.

FIG. 6B is a flow chart illustrating an exemplary method 650, which may be carried out by NetOps to determine the location of a macro-network base station. In particular, NetOps receives a message from the base station that includes: (a) the listed broadcast frequency for each of a number of FM stations (preferably three or more) in the market in which the first base station is located, as well as the corresponding angles of arrival at the first base station for the FM radio signal from each FM stations, and (b) the BS_ID and the broadcast frequency of a second BS, as shown by block 652. NetOps then identifies a subset of all markets as potential markets, by determining which markets include a base station that has the reported BS_ID and is operating at the reported transmission frequency, and eliminating from consideration the markets that do not, as shown by block 654. NetOps further narrows the set of potential markets by determining which of the potential markets also has all of the FM stations identified by the first base station (i.e., FM stations broadcasting at all broadcast frequencies reported by the first base station), and removing those that do not from the subset of potential markets, as shown by block 656.

When NetOps attempts to perform a triangulation-based location-determination technique based upon the reported angle-of-arrival data, but inputs incorrect locations for the corresponding signal sources (e.g., the FM stations), an error will result. In particular, triangulation will not yield a crossing point since the arrangement of the FM stations in the market in which the base station is location will differ from the arrangement of the FM stations having the same identification information in other markets. Therefore, when triangulation based on the locations of matching FM stations in one of the potential markets produces a valid crossing point, this indicates to NetOps that it has identified the market in which the base station is located, and that the crossing point is the correct location of the base station. Accordingly, once NetOps has determined a set of potential markets, NetOps may test the potential markets one at a time, applying a location determination process in each potential market until the application of the triangulation-based techniques yields a valid crossing point in one of the potential markets.

More specifically, NetOps may select a next potential market from the identified set of potential markets, as shown by block 658. NetOps then determines which FM stations in the market match the identification information provided by the base station, and determines the geographic locations the FM stations in the potential market having the listed broadcast frequencies reported by the base station, as shown by block 660. NetOps then attempts to triangulate the location of the first base station using the determined FM-station locations and the corresponding angles-of-arrival reported by the base station, as shown by block 661, and determines whether a valid location results, as shown by block 662. If a valid location (e.g., a crossing point) results, then NetOps sets this location as the location of the base station, as shown by block 664. On the other hand, if the location-determination process fails (e.g., if no valid crossing point can be determined), then NetOps selects the next potential market, as shown by block 608, and repeats blocks 610-612 for the next potential market. NetOps may then repeat blocks 608-612, attempting to determine a crossing point in each potential market until a crossing point is successfully determined in one of the potential markets.

In an alternative embodiment, before setting the determined crossing point as the location of the first base station, NetOps may verify the determined crossing point by checking whether the crossing point is within the broadcast range of the first base station. In particular, NetOps may use the reported identification information for the nearby base station to determine the nearby base station's location. Then, before setting the determined crossing point as the geographic location of the base station, NetOps may verify that the crossing point is within the broadcast range of the first base station. For example, if a macro-network base station has a broadcast range that is limited to two miles, then NetOps may verify that the crossing point and the nearby base station are within two miles from each other. It should be understood that the broadcast range of a base station may vary, and that verification of the crossing point may vary accordingly as well, without departing from the scope of the invention.

III. Exemplary Local-Oscillator Stabilization Methods

A. Local-Oscillator Stabilization at a Macro-Network Base Station

As noted, an exemplary WiMAX base station may be configured to use an FM radio signal as a reference signal for stabilization of its local oscillator. However, since an FM signal may experience phase drift, and/or because the exact frequency of the FM signal may not be known, simply phase-locking the local oscillator to the FM signal with nothing further, would most likely result in the local oscillator failing to meet FCC requirements for accuracy. Therefore, after an exemplary base station begins providing WiMAX service (i.e., after the setup period ends), the base station periodically adjusts the local oscillator based on phase-error information provided by NetOps, in order to account for any phase drift of the FM signal. (Note that the base station may begin making such phase adjustments during the setup period as well.)

Figure 7:
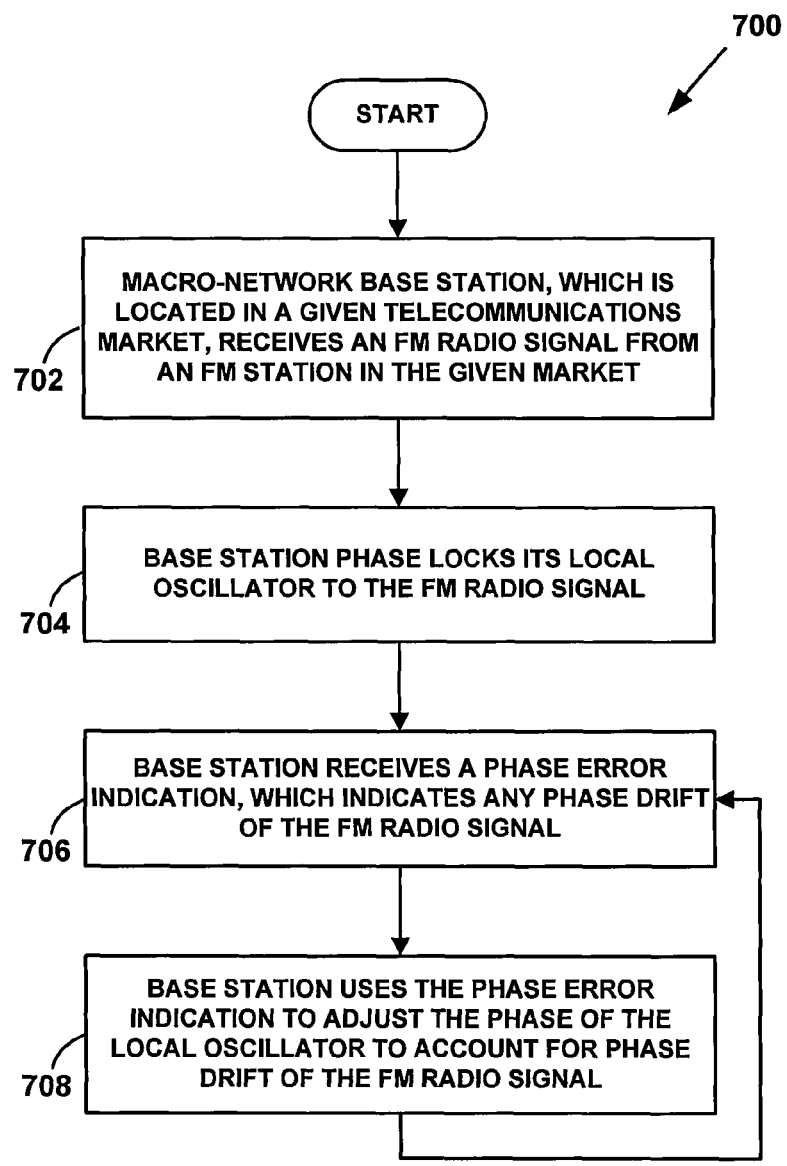
FIG. 7 is a flow chart illustrating a method for stabilizing a local oscillator, according to an exemplary embodiment.

FIG. 7 is a flow chart illustrating a method 700 for stabilizing a local oscillator, according to an exemplary embodiment. Specifically, method 700 involves a macro-network base station in a macro network, which is located in a given telecommunications market, receiving an FM radio signal from an FM station that is also located in the market, as shown by block 702. The base station then phase-locks its local oscillator to the FM radio signal, as shown by block 704. Further, the base station periodically receives a phase-error indication, which indicates any phase drift that has been experienced by the FM radio signal, as shown by block 706. Accordingly, the base station uses the received phase-error indications to periodically adjust the phase of the local oscillator in order to account for phase drift of the FM radio signal, as shown by block 708.

In a further aspect, an exemplary method may initially involve the base station searching for the FM radio signal having the greatest signal strength, or possibly an FM radio signal with a signal strength above a predetermined threshold. The base station may then select this FM radio signal as the signal to use for local oscillator stabilization. In addition, once a base station has selected a given FM signal, the base station may report the selection to NetOps so that NetOps can periodically provide updated phase-error information for the selected FM signal. For example, the base station may report the selected FM station to NetOps by sending NetOps a message indicating the broadcast frequency (e.g., 99.1 MHz) of the FM signal. As another example, the base station may report the call letters (e.g., WQRX) of the FM station. The base station may identify the FM radio signal in other formats and using other techniques as well.

In an alternative embodiment, during the setup period, an exemplary WiMAX base station may be further configured to perform an initial calibration of its local oscillator using the broadcast signal from a nearby macro-network base station as a reference. The nearby WiMAX base station also must comply with FCC requirements, and thus provides a reliable reference signal to use for calibration. In such an embodiment, the base station may first phase-lock its local oscillator to the WiMAX signal from the nearby macro-network base station. However, since the base station eventually needs to use its WiMAX communication interface to provide WiMAX service, the base station cannot continue to receive the signal from the nearby base station once it switches to operating mode, and thus cannot maintain a phase lock to the broadcast signal once it begins providing WiMAX service. Accordingly, after calibrating its local oscillator to the WiMAX signal, the base station may transfer the phase lock to an FM radio signal so that the base station may begin using its WiMAX interface to provide WiMAX service.

To implement such an alternative embodiment, a WiMAX base station may initially search for a signal from a nearby base station. Typical WiMAX base stations transmit a signal within a 10 MHz channel allocated for macro network communications, and can vary the transmission frequency in 250 kHz steps throughout the U.S. authorized Broadband Radio Service (BRS band) frequency range of 2496 MHz to 2690 MHz. To search for the signal from a nearby base station, a given base station may scan the BRS band by certain standard channels that base stations in a given network typically operate on. These standard channels are typically predefined and may be selected as a matter of engineering design choice. Then, if no base station is found after a scan of the standard channels by, for example, adjusting the channel raster in 250 kHz steps from the standard channels. Further, when a base station acquires a signal from a nearby base station, it may check the network operator identifier in the received signal, to make sure that it is synchronizing with a base station in its own network (e.g., that is operated by the same service provider).

Once the broadcast signal from the nearby base station is acquired, the base station may stabilize its local oscillator using the broadcast signal. To use the broadcast signal as a reference for local-oscillator stabilization, the base station may need to determine the precise frequency at which the nearby base station is transmitting the broadcast signal. In practice, however, a base station may only know the approximate frequency with which the nearby base station is transmitting. As such, to calibrate the local oscillator with the level of accuracy meeting FCC requirements, the base station may query NetOps for the actual transmission frequency of the nearby base station.

The base station may identify the nearby base station to NetOps by sending NetOps a request message that includes the BS_ID of the nearby base station. Macro-network base stations typically includes their respective BS_IDs in their respective broadcast signals. Accordingly, the first base station may learn the BS_ID of the nearby base station in the broadcast signal it receives from the nearby base station. NetOps preferably responds to the base station with a message that indicates the actual frequency at which the nearby base station is operating. To facilitate the query, NetOps may accordingly maintain or have access to a database indicating the frequency of operation of each base station in the macro network. Further, so that NetOps can populate this database, each base station in the macro network may routinely report its frequency of operation (i.e., its transmission frequency) to NetOps. Therefore, provided with the BS_ID for a given base station, NetOps can simply look up the actual frequency of operation for the base station, and respond to the querying base station by indicating the actual frequency, so that the base station can stabilize its local oscillator.

B. Network Operations Center Support for Local-Oscillator Stabilization

Figure 8:
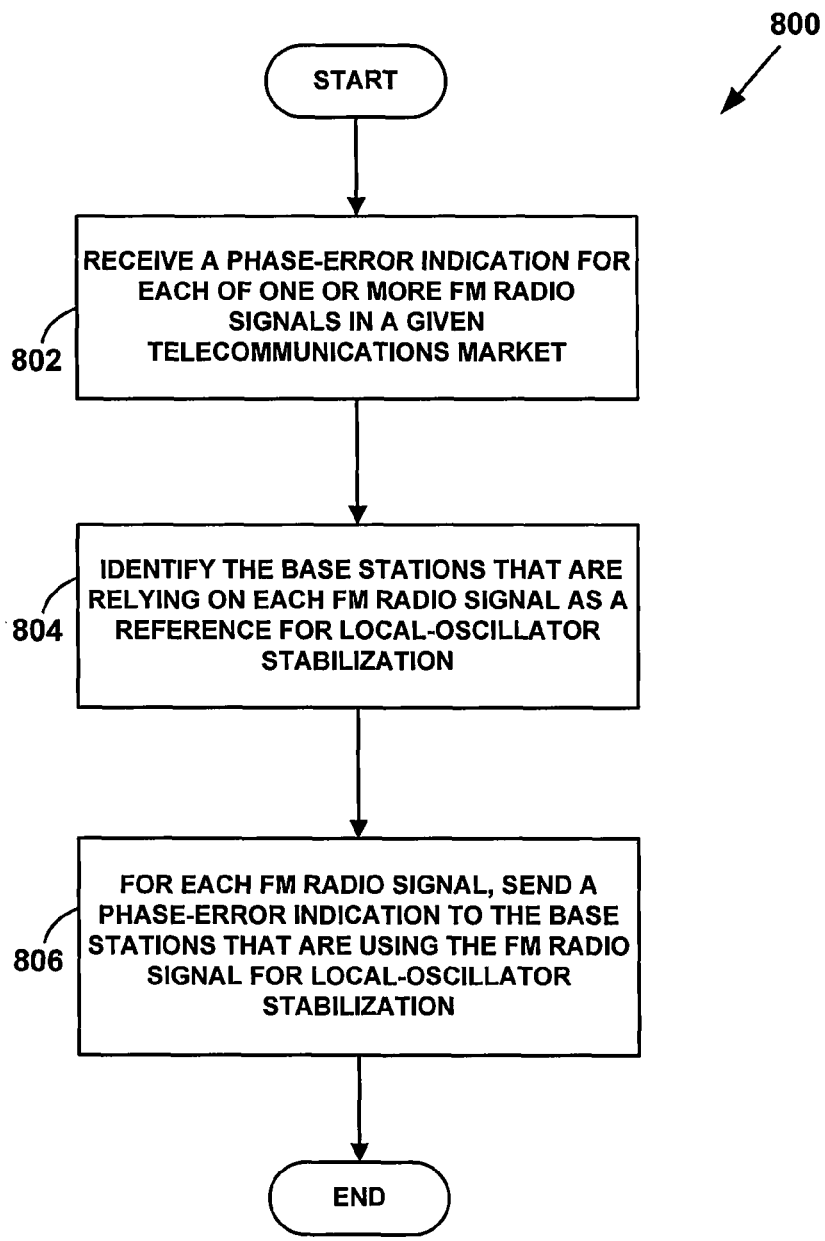
FIG. 8 is flow chart illustrating a method for facilitating local-oscillator stabilization at one or more base stations in a macro network, according to an exemplary embodiment.

FIG. 8 is flow chart illustrating a method 800 for facilitating local-oscillator stabilization at one or more base stations in a macro network, according to an exemplary embodiment. In particular, method 800 may be carried out by NetOps (or possibly another macro-network entity) to distribute phase-error indications received from various IMBMs, to the appropriate macro-network base stations. As shown, method 800 involves NetOps receiving a phase-error indication for each of one or more FM radio signals in a given telecommunications market, as shown by block 802. When updated phase-error information is received, NetOps identifies the base stations that are relying on each of the FM radio signals as a reference for local-oscillator stabilization, as shown by block 804. Then, for each FM radio signal, NetOps sends a phase-error indication for the FM radio signal to the base stations that are using the FM radio signal for local-oscillator stabilization, as shown by block 806.

In a further aspect, NetOps may be configured to periodically provide a phase-error indication to each base station served by NetOps. In an exemplary embodiment, NetOps may provide phase-error indications every one to three seconds. However, the duration of the period between phase-error indications may be varied as a matter of engineering design choice.

C. In-Market Broadcast Monitor Support for Local-Oscillator Stabilization

As noted above, a service provider may install an IMBM in each market to provide NetOps with phase-error information for each FM radio signal in the market, so that NetOps may in turn provide the phase-error information to base stations using the FM radio signal as a reference for local-oscillator stabilization. FIG. 9 is a flow chart illustrating a method 900 that may be implemented by an IMBM. In particular, method 900 may be implemented by an IMBM to provide phase-error information that can ultimately be used for local-oscillator stabilization by macro-network base stations.

As shown, method 900 involves the IMBM receiving an FM radio signal that is broadcast by an FM station in a given telecommunications market, as shown by block 902. The IMBM also receives a GPS signal, as shown by block 904. The IMBM then determines a phase error for the FM radio signal. In particular, the IMBM divides down the FM radio signal to generate a comparison signal, as shown by block 906. The IMBM then determines the phase difference between the comparison signal and the GPS signal, as shown, as shown by block 908. The IMBM can then provide the phase error of the FM radio signal, which is indicated by the phase difference between the comparison signal and the GPS signal, for use by one or more base stations in the macro network. For example, the IMBM may send NetOps a phase-error indication, which indicates the phase difference between the comparison signal and the GPS signal, as shown by block 910. NetOps may then disseminate the phase-error indication to those base stations relying on the given FM radio signal. Furthermore, an exemplary IMBM may repeat method 900 for each FM signal that is broadcast in its market.

In an exemplary embodiment, IMBM 216 may calculate the phase error of a given FM signal by dividing down the FM signal to 10 MHz, and comparing the result to the 10 MHz GPS reference signal. (Note that in practice, the GPS reference signal is typically 10.23 MHz, but 10 MHz is used in the following example to simplify calculations.) For instance, to divide down the FM radio signal, the IMBM 216 may divide the FM signal by a signal having a frequency such that the comparison signal should be a 10 MHz signal. For instance, if a given FM station has a listed broadcast frequency of 99.1 MHz, the IMBM 216 may divide the FM radio signal from the FM station digitally by a 9,910,000. If the actual broadcast frequency of the FM radio signal is 99.1 MHz, then this will result in a comparison signal that is 10 MHz. However, because the FM signal may have experienced phase drift, the comparison signal produced by dividing down the FM radio signal is unlikely to be exactly 10 MHz. Therefore, to calculate the phase drift (i.e., the deviation of the output signal from 10 MHz), IMBM 216 compares the output signal to a 10 MHz reference signal that is known to be accurate, such as a GPS timing signal.

In practice, the FM signal may be divided down using a digital counter. More specifically, the FM signal may be input into the digital counter, which then outputs a transition periodically whenever it reaches an achieving count. In particular, the IMBM may be configured to generate output pulse each time a given count is satisfied. The period between occurrences of this pulse may then be phase-compared to the period between pulses in a reference-pulse signal, and a difference voltage may then be generated. This difference voltage is then converted to a proportional positive or negative numeric value (i.e., the phase-error indication, which may also be referred to as a phase offset value) and provided to the appropriate base stations to use to correct the phase of their respective local oscillators. Accordingly, an exemplary IMBM may include: (i) a divider, and (ii) a phase comparator that is configured to compare the output of the divider and the GPS reference signal to determine the phase offset value to be provided to the base stations.

In a further aspect, an exemplary IMBM may be configured to periodically determine and provide phase-error indications to NetOps. In an exemplary embodiment, each IMBM may provide phase-error indications every one to three seconds. However, the duration of the period between phase-error indications may be varied as a matter of engineering design choice.

IV. Exemplary Frame-Start Synchronization Methods

A. Frame Start Synchronization at a Macro-Network Base Station

In an exemplary embodiment, a macro-network base station is preferably configured to provide service by transmitting a broadcast signal that is synchronized with the broadcast signals from nearby base stations. In particular, as the macro-network signal is structured as a series of frames of a predetermined duration, the base station may achieve what may be referred to as "frame-start synchronization" by synchronizing the time at which the transmission of each frame is initiated with nearby base stations. An exemplary base station preferably accomplishes frame-start synchronization without a GPS signal, and thus does not require line-of-sight access to a GPS satellite for frame-start synchronization.

Figure 10A:
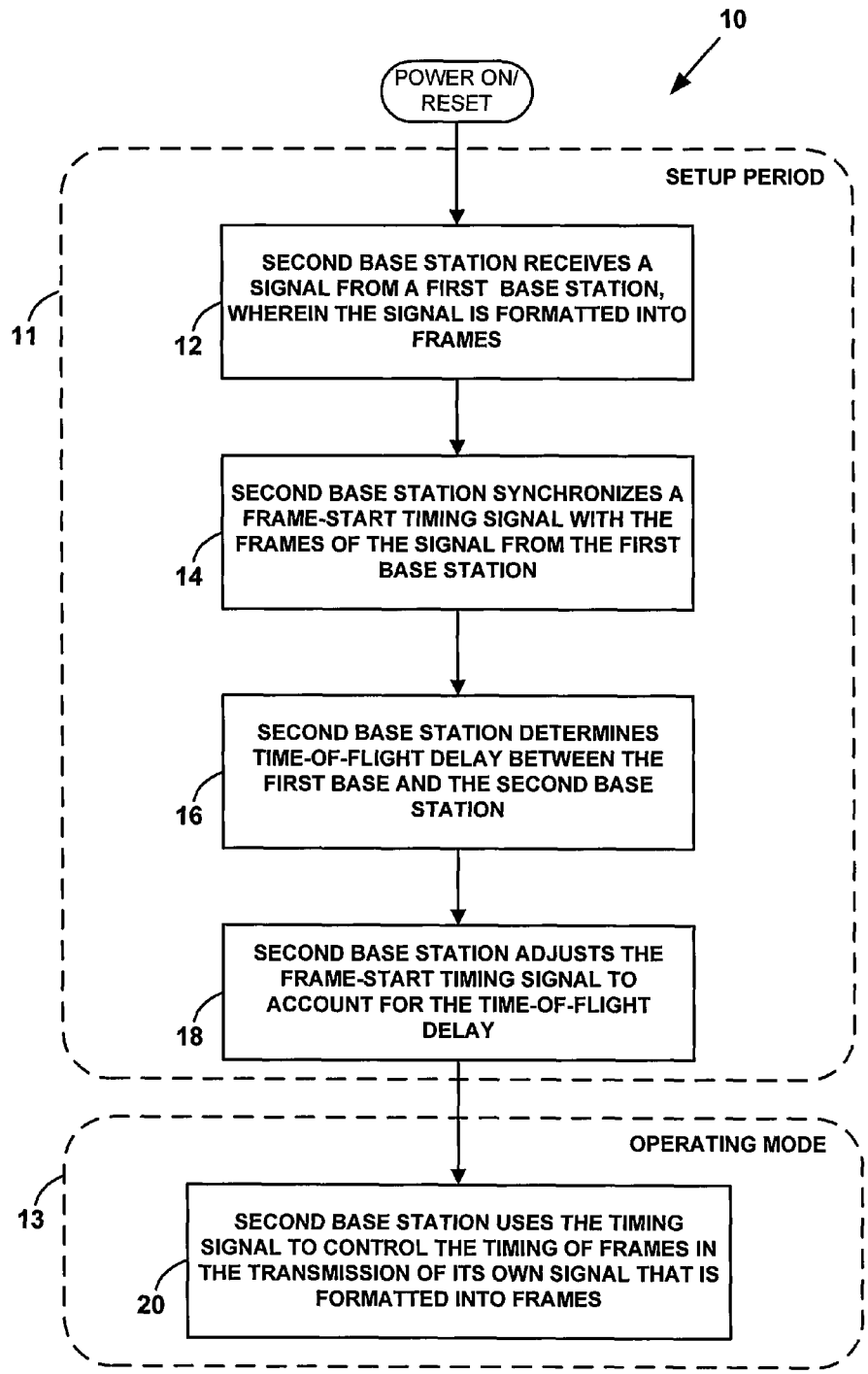
FIG. 10A is a flow chart illustrating a method for frame-start synchronization, according to an exemplary embodiment.

FIG. 10A is a flow chart illustrating a method 10 for frame-start synchronization, according to an exemplary embodiment. As part of its setup routine, a base station may carry out a first portion 11 of the method 10 in which it establishes a frame-start timing signal that is synchronized to frames in a broadcast signal from a nearby base station. The timing signal may then be used to control frame transmissions in a second portion 13 of the method 10, which the base station carries out once the base station switches to its operating mode.

More specifically, method 10 involves a second macro-network base station receiving a first broadcast signal from a first macro-network base station, where the first signal is formatted into frames, as shown by block 12. The second base station then synchronizes a frame-start timing signal with the frames in the first signal, as shown by block 14. In particular, the first base station synchronizes frame-start triggers with the receipt of frames from the first base station. As such, the frequency of the frame-start triggers in the timing signal is matched to the frequency of frame transmissions by the first base station. However, because of the time-of-flight delay between the first base station and the second base station, the periodic frame-start triggers are out of synchronization with the actual transmission of the frames by the first base station.

Accordingly, the second base station determines the time-of-flight delay between the first base station and the second base station, as shown by block 16. The second base station may then adjust the timing offset of the frame-start signal to account for the time-of-flight delay, as shown by block 18. By accounting for the time-of-flight delay, the periodic frame-start trigger in the timing signal is synchronized to the timing of frame transmissions by the first base station. Therefore, when the second base station ends its setup routine and switches to operating mode, the second base station may use the frame-start timing signal to control the timing of frames in the transmission of its own broadcast signal, which is likewise formatted into frames, as shown by block 20.

Preferably, the determination of the time-of-flight delay between the first base station and the second base station involves the second base station querying NetOps for the time-of-flight delay. Since the speed at which the signal travels is typically a known value, the calculation of the time-of-flight delay between a signal source and a recipient typically involves determining the distance between the source and the recipient. Accordingly, the second base station's query to NetOps preferably includes: (i) the identifier of the first base station and (ii) and the geographic location of the second base station. NetOps may use the identifier of the first base station to look up the location of the first base station, and then determine the distance between the first base station's location and the second base station's location.

Furthermore, in order that the second base station can provide its geographic location to NetOps without using GPS, the second base station preferably determines its location using a technique that does not involve GPS. For example, the first base station may use a location-determination method described herein, such as method 600 of FIG. 6A. However, it is also possible that the first base station may determine its location in another manner, without departing from the scope of the invention.

B. Network Operations Center Support for Frame-Start Synchronization

Figure 10B:
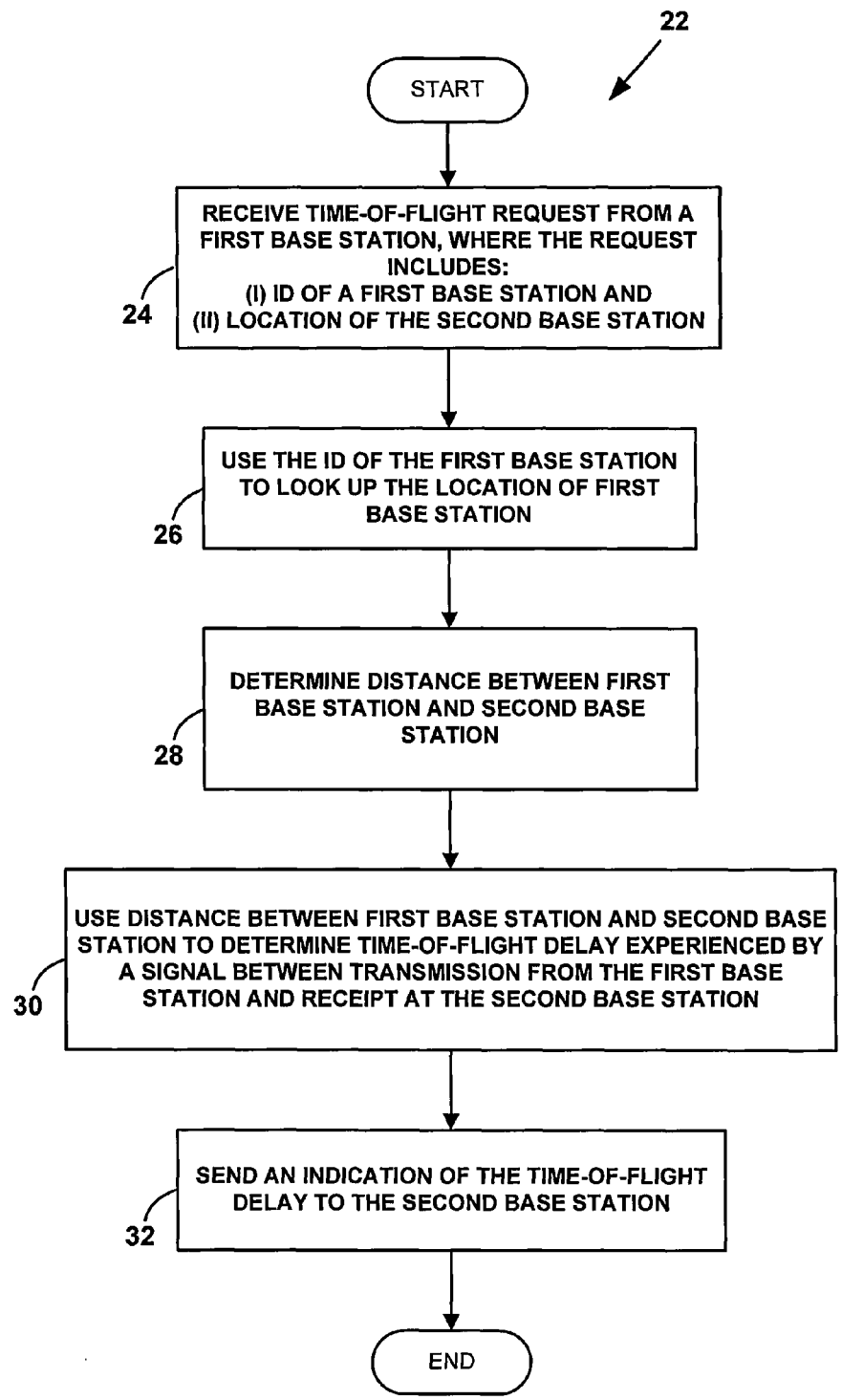
FIG. 10B is a flow chart illustrating a method for facilitating frame-start synchronization of a base station, according to an exemplary embodiment.

FIG. 10B is a flow chart illustrating a method 22 for facilitating frame-start synchronization of a base station, according to an exemplary embodiment. Method 22 may be carried out by NetOps or another core-network entity in order to provide a base station with the time-of-flight delay from a nearby base station, so that the base station can synchronize its frame transmissions with the nearby base station.

As shown, method 22 involves NetOps receiving a time-of-flight request from the second base station, where the time-of-flight request includes (i) an identifier of a first base station, and (ii) the geographic location of the second base station, as shown by block 24. NetOps then uses the identifier of the first base station to look up the location of the first base station, as shown by block 26. Provided with the locations of the first and second base stations, NetOps can then determine the distance between the first base station and the second base station, as shown by block 28. NetOps then uses the distance between the first base station and the second base station to determine the time-of-flight delay experienced by a signal between transmission from the first base station and receipt at the second base station, as shown by block 30. NetOps may then send an indication of the time-of-flight delay to the second base station, as shown by block 32.

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented in whole or in part by software (e.g., machine language instructions stored in data storage and executable by a processor), firmware, and/or hardware.

We claim:

1. A method for frame-start synchronization with nearby base stations in a macro network, the method comprising:
   (a) a second base station receiving a first signal from a first base station in the macro network, wherein the first signal comprises frames, and wherein the first signal further comprises an identifier of the first base station;
   (b) the second base station synchronizing a frame-start timing signal with the frames in the first signal;
   (c) the second base station determining a time-of-flight delay between the first base station and the second base station;
   (d) the second base station adjusting timing of the frame-start signal to account for the time-of-flight delay between the first base station and the second base station; and
   (e) the second base station broadcasting a second signal that is formatted into frames, wherein the second base station uses the frame-start timing signal to control timing of the frames in the second signal.

2. The method of claim 1, wherein the second base station carries out steps (a)-(d) during a setup routine, and wherein the second base station carries out step (e) after finishing the setup routine and switching to an operating mode.

3. The method of claim 1, wherein the second base station switches out of the operating mode, repeats the setup routine, and then switches back to the operating mode.

4. The method of claim 1, wherein the second base station determining the time-of-flight delay between the first base station and the second base station comprises:
   the second base station determining its geographic location;
   the second base station sending (i) the identifier of the first base station and (ii) the geographic location of the second base station to a network operations center for use in a determination of a distance between the first base station and the second base station; and
   the second base station receiving an indication of the time-of-flight delay from the network operations center, wherein the time-of-flight delay is based at least in part on the distance between the first base station and the second base station.

5. The method of claim 1, wherein synchronizing the frame-start timing signal with the frames in the first signal comprises creating periodic frame-start triggers in the frame-start timing signal, wherein the frame-start triggers occur in the timing signal at a frequency that is matched to a frequency of frame transmissions by the first base station.

6. A base station configured to provide wireless service in a coverage area of a macro network, wherein the base station is configured to communicate with client devices in the coverage area via a signal comprising frames, the base station comprising:
  a macro-network communication interface;
  a backhaul communication interface; and
  program instructions stored in a non-transitory tangible computer readable medium and executable by at least one processor to:
    (a) cause the macro-network communication interface to receive a first signal from a nearby base station in the macro network, wherein the first signal comprises a plurality of frames, and wherein the first signal further comprises an identifier of the base station;
    (b) synchronize a frame-start timing signal with receipt of the frames in the first signal;
    (c) determine a time-of-flight delay experienced by the first signal between transmission of the first signal from the nearby base station and receipt of the first signal;
    (d) adjust timing of the frame-start signal to account for the determined time-of-flight delay; and
    (e) cause the base station to broadcast transmit a second signal that comprises frames, wherein the frame-start timing signal is used to control timing of the frames in the second signal.

7. The base station of claim 6, wherein the program instructions stored in the non-transitory tangible computer readable medium and executable by the at least one processor to determine the time-of-flight delay experienced by the first signal comprise program instructions stored in the non-transitory tangible computer readable medium and executable by the at least one processor to:
  determine a geographic location of the base station;
  send (i) an identifier of the nearby base station and (ii) the geographic location of the base station to a network operations center for use in a determination of a distance between the nearby base station and the base station; and
  receive, at the base station, from the network operations center, an indication of the time-of-flight delay between the base station and the nearby base station, wherein the time-of-flight delay is determined based at least in part on the distance between the base station and the nearby base station.

8. The base station of claim 6, wherein the program instructions stored in the non-transitory tangible computer readable medium and executable by the at least one processor to synchronize the frame-start timing signal with receipt of the frames in the first signal comprise:
  program instructions stored in the non-transitory tangible computer readable medium and executable by the at least one processor to synchronize periodic frame-start triggers in the frame-start timing signal with the receipt of frames in the first signal such that a frequency at which the frame-start triggers occur is equal to a frequency at which the frames are received.

9. The base station of claim 6, further comprising program instructions stored in the non-transitory tangible computer readable medium and executable by the at least one processor to perform functions (a)-(d) during a setup routine, and to perform function (e) after finishing the setup routine and switching to an operating mode.

10. The base station of claim 6, further comprising program instructions stored in the non-transitory tangible computer readable medium and executable by the at least one processor to: switch out of the operating mode, repeat the setup routine, and then switch back to the operating mode.

11. A method for facilitating frame-start synchronization of a base station, the method comprising:
  a core-network component receiving a request from a second base station for a time-of-flight delay between a first base station and the second base station, wherein the request includes (i) an identifier of the first base station and (ii) a geographic location of the second base station, and wherein the second base station is configured to use the time-of-flight delay to synchronize a frame-start timing signal with frames in a signal of the first base station;
  the core-network component using the identifier of the first base station as a basis to determine a geographic location of the first base station;
  based at least in part on both (i) the received geographic location of the second base station and (ii) the determined geographic location of the first base station, the core-network component determining a distance between the first base station and the second base station;
  the core-network component using the distance between the first base station and the second base station as a basis to determine the time-of-flight delay experienced by a signal between the first base station and the second base station; and
  the core-network component sending an indication of the time-of-flight delay to the second base station.

* * * * *